(12) United States Patent
Fernandez et al.

(10) Patent No.: US 7,982,454 B2
(45) Date of Patent: Jul. 19, 2011

(54) CALIBRATION CIRCUITS AND METHODS FOR A PROXIMITY DETECTOR USING A FIRST ROTATION DETECTOR FOR A DETERMINED TIME PERIOD AND A SECOND ROTATION DETECTOR AFTER THE DETERMINED TIME PERIOD

(75) Inventors: Devon Fernandez, Manchester, NH (US); Jeff Eagen, Amherst, NH (US); Glenn A. Forrest, Bow, NH (US); Mathew Drouin, Manchester, NH (US)

(73) Assignee: Allegro Microsystems, Inc., Worcester, MA (US)

( * ) Notice: Subject to any disclaimer, the term of this patent is extended or adjusted under 35 U.S.C. 154(b) by 641 days.

(21) Appl. No.: 11/768,370

(22) Filed: Jun. 26, 2007

(65) Prior Publication Data

US 2009/0001972 A1    Jan. 1, 2009

(51) Int. Cl.
*G01B 7/30*    (2006.01)
(52) U.S. Cl. ............ 324/207.25; 324/207.2; 324/207.21
(58) Field of Classification Search .................. None
See application file for complete search history.

(56) References Cited

U.S. PATENT DOCUMENTS

| | | |
|---|---|---|
| 3,582,932 A | 6/1971 | Chapman |
| 3,944,792 A | 3/1976 | Sautner |
| 5,493,219 A | 2/1996 | Makino et al. |
| 5,650,719 A | 7/1997 | Moody et al. |
| 5,694,038 A | 12/1997 | Moody et al. |
| 5,729,130 A | 3/1998 | Moody et al. |
| 5,917,320 A | 6/1999 | Scheller et al. |
| 6,091,239 A | 7/2000 | Vig et al. |
| 6,232,768 B1 * | 5/2001 | Moody et al. ............ 324/207.12 |
| 6,242,908 B1 * | 6/2001 | Scheller et al. ............ 324/207.2 |
| 6,297,627 B1 * | 10/2001 | Towne et al. ............ 324/207.12 |

(Continued)

FOREIGN PATENT DOCUMENTS

EP    0 875 733 A2    11/1998

(Continued)

OTHER PUBLICATIONS

Fericean; "New Noncontacting Inductive Analog Proximity and Inductive Linear Displacement Sensors for Industrial Automation;" IEEE Sensors Journal; vol. 7, No. 11; Nov. 2007; 8 sheets.

(Continued)

*Primary Examiner* — Patrick J Assouad
*Assistant Examiner* — David M. Schindler
(74) *Attorney, Agent, or Firm* — Daly, Crowley, Mofford & Durkee, LLP

(57) ABSTRACT

A proximity detector employs a first peak detector circuit and a second peak detector circuit, both responsive to a magnetic field signal. The second peak detector circuit includes a positive peak detector circuit and a negative peak detector circuit, each of which have a predetermined excursion limit in an outward direction away from a center voltage of the magnetic field signal so as to be less affected by a large signature region in the magnetic field signal. The proximity detector also includes an output control circuit. The output control circuit is configured to provide an output signal, which, during a determined time period, changes state in response to the first peak detector circuit, and which, after the determined time period, changes state in response to the second peak detector circuit.

20 Claims, 10 Drawing Sheets

U.S. PATENT DOCUMENTS

| | | |
|---|---|---|
| 6,525,531 B2 | 2/2003 | Forrest et al. |
| 6,693,419 B2 | 2/2004 | Stauth et al. |
| 7,199,579 B2 | 4/2007 | Scheller et al. |
| 2003/0222637 A1 | 12/2003 | Stauth et al. |
| 2005/0194970 A1 | 9/2005 | Scheller et al. |
| 2007/0164732 A1 | 7/2007 | Voisine et al. |

FOREIGN PATENT DOCUMENTS

| | | |
|---|---|---|
| EP | 0 875 733 A3 | 11/1998 |
| WO | WO 03/069358 A2 | 8/2003 |
| WO | WO 03/069358 A3 | 8/2003 |

OTHER PUBLICATIONS

PCT Search Report of the ISA for PCT/US2008/066009 dated Dec. 9, 2008.

PCT Written Opinion of the ISA for PCT/US2008/066009 dated Dec. 9, 2008.

PCT Preliminary Report on Patentability for PCT/US2008/066009; dated Jan. 14, 2010;; 9 pages.

\* cited by examiner

CALIBRATION CIRCUITS AND METHODS FOR A PROXIMITY DETECTOR USING A FIRST ROTATION DETECTOR FOR A DETERMINED TIME PERIOD AND A SECOND ROTATION DETECTOR AFTER THE DETERMINED TIME PERIOD

CROSS REFERENCE TO RELATED APPLICATIONS

Not Applicable.

STATEMENT REGARDING FEDERALLY SPONSORED RESEARCH

Not Applicable.

FIELD OF THE INVENTION

This invention relates generally to integrated circuits and, more particularly, to integrated circuits for detecting movement or rotation of a ferrous object or a magnet.

BACKGROUND OF THE INVENTION

Proximity detectors for detecting ferrous articles and/or magnetic articles are known. The magnetic field associated with the ferrous article or magnet is detected by a magnetic field transducer, such as a Hall element or a magnetoresistance element, which provides a signal (i.e., a magnetic field signal) proportional to a detected magnetic field. In some arrangements, the magnetic field signal is an electrical signal.

One application for a proximity detector is to detect the approach and retreat of each tooth of a rotating ferrous or soft ferromagnetic gear. In some arrangements, a ring magnet having magnetic regions (permanent or hard magnetic material) with alternating polarity is coupled to the ferrous gear or is used by itself and the magnetic field sensor is responsive to approach and retreat of the magnetic regions of the ring magnet. The proximity detector processes the magnetic field signal to generate an output signal that changes state each time the magnetic field signal either reaches a peak (positive or negative peak) or crosses a threshold level. Therefore, the output signal, which has an edge rate or period, is indicative of a speed of rotation of the ferrous gear or of the ring magnet.

In one type of proximity detector, sometimes referred to as a peak-to-peak percentage detector (or threshold detector), a threshold level is equal to a percentage of the peak-to-peak magnetic field signal. One such peak-to-peak percentage detector is described in U.S. Pat. No. 5,917,320 entitled "Detection of Passing Magnetic Articles While Periodically Adapting Detection Threshold" and assigned to the assignee of the present invention.

Another type of proximity detector, sometimes referred to as a slope-activated detector or as a peak-referenced detector, is described in U.S. Pat. No. 6,091,239 entitled "Detection Of Passing Magnetic Articles With a Peak Referenced Threshold Detector," which is assigned to the assignee of the present invention. Another such peak-referenced proximity detector is described in U.S. Pat. No. 6,693,419, entitled "Proximity Detector," which is assigned to the assignee of the present invention and incorporated herein by reference. Another such peak-referenced proximity detector is described in U.S. Pat. No. 7,199,579, entitled "Proximity Detector," which is assigned to the assignee of the present invention and incorporated herein by reference. In the peak-referenced proximity detector, the threshold signal differs from the positive and negative peaks (i.e., the peaks and valleys) of the magnetic field signal by a predetermined amount. Thus, in this type of proximity detector, the output signal changes state when the magnetic field signal comes away from a peak or valley by the predetermined amount.

Some proximity detectors use two types of detectors and switch between the two types, for example, as described in U.S. patent application Ser. No. 11/333,522, filed Jan. 13, 2006, entitled "Method and Apparatus for Magnetic Article Detection," which is assigned to the assignee of the present invention and incorporated herein by reference.

It should be understood that, because the above-described peak-to-peak percentage detector and the above-described peak-referenced detector both have circuitry that can identify the positive and negative peaks of a magnetic field signal, the peak-to-peak percentage detector and the peak-referenced detector both include a peak detector circuit adapted to detect a positive peak and a negative peak of the magnetic field signal. Each, however, uses the detected peaks in different ways.

In order to accurately detect the positive and negative peaks of a magnetic field signal, the proximity detector is capable of tracking at least part of the magnetic field signal. To this end, typically, one or more digital-to-analog converters (DACs) can be used to generate a tracking signal, which tracks the magnetic field signal. For example, in the above-referenced U.S. Pat. Nos. 5,917,320 and 6,091,239, two DACs are used; one (PDAC) to detect the positive peaks of the magnetic field signal and the other (NDAC) to detect the negative peaks of the magnetic field signal.

Some types of proximity detectors perform one or more types of calibration, typically at a time near to start up or power up of the proximity detector. During one type of calibration, in particular for a peak-to-peak percentage detector (threshold detector), the above-described threshold level is determined. Immediately upon startup, the threshold may have a value that results in an improper output from the proximity detector.

In some applications, the ferrous or soft ferromagnetic gear or the ring magnet includes a "signature structure," which is different than other parts of the ferrous or soft ferromagnetic gear or ring magnet. During operation, i.e., when the ferrous or soft ferromagnetic gear or ring magnet is rotating, the signature structure passes near to the magnetic field sensor, resulting in a "signature region" in the magnetic field signal generated by the magnetic field sensor. The signature region allows the proximity detector, or a processor that receives the output signal from the proximity detector, to identify an absolute angle of rotation of the ferrous or soft ferromagnetic gear or ring magnet. However, if the signature region is generated near to a time when the proximity detector is attempting a calibration (typically near to a start up time), the calibration of the threshold(s) can be degraded, resulting in an inaccurate output, or no output, from the proximity detector for at least a period of time.

SUMMARY OF THE INVENTION

In accordance with one aspect of the present invention, a proximity detector includes a magnetic field transducer for providing a magnetic field signal indicative of a changing magnetic field. The proximity detector also includes a first peak detector circuit responsive, during a determined time period, to the magnetic field signal, for providing a first tracking signal, which holds a first value corresponding to a positive peak of the magnetic field signal, and which holds a second value corresponding to a negative peak of the magnetic field signal. The proximity detector also includes a second peak detector circuit responsive, during the determined time period and also after the determined time period, to the magnetic field signal, for providing a second tracking signal, which holds a third value corresponding to a positive peak of the magnetic field signal, and for providing a third tracking signal, which holds a fourth value corresponding to a negative peak of the magnetic field signal. The second tracking signal has an upward excursion limit and a downward excursion limit. The upward excursion limit of the second tracking signal is smaller than the downward excursion limit of the second tracking signal. The third tracking signal also has an upward excursion limit and a downward excursion limit. The upward excursion limit of the third tracking signal is larger than the downward excursion limit of the third tracking signal. The proximity detector also includes an output control circuit coupled to the first and second peak detector circuits and coupled to receive the magnetic field signal. The output control circuit is configured to provide an output signal, which, during the determined time period, changes state in response to the first peak detector circuit, and which, after the determined time period, changes state in response to the second peak detector circuit.

In accordance with another aspect of the present invention, a method of detecting a ferromagnetic article includes generating a magnetic field signal indicative of changing magnetic field. The method also includes generating, during a determined time period, a first tracking signal, which holds a first value corresponding to a positive peak of the magnetic field signal, and which holds a second value corresponding to a negative peak of the magnetic field signal. The method also includes generating, during the determined time period and also after the determined time period, a second tracking signal, which holds a third value corresponding to a positive peak of the magnetic field signal. The second tracking signal has an upward excursion limit and a downward excursion limit. The upward excursion limit of the second tracking signal is smaller than the downward excursion limit of the second tracking signal. The method also includes generating, during the determined time period and also after the determined time period, a third tracking signal, which holds a fourth value corresponding to a negative peak of the magnetic field signal. The third tracking signal also has an upward excursion limit and a downward excursion limit. The upward excursion limit of the third tracking signal is larger than the downward excursion limit of the third tracking signal. The method also includes generating an output signal, which, during the determined time period, changes state in response to the first peak detector circuit, and which, after the determined time period, changes state in response to the second peak detector circuit.

With these particular arrangements, the excursion limits provide a proximity detector and proximity detection method that are less affected by the presence of a signature region in a magnetic field signal.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Before describing the present invention, some introductory concepts and terminology are explained. As used herein, the term "peak detector circuit" is used to describe a circuit that can hold a signal representative of a positive peak or a negative peak (or both) of a magnetic field signal. It should be understood that both a peak-referenced detector and a peak-to-peak percentage detector employ a peak detector circuit of some sort.

Operation of a so-called "calibration mode" is described herein. Reference is also made herein to a so-called "running mode," in particular, a running mode associated with a peak-to-peak percentage detector. Operation of the running mode is described in greater detail in one or more of the above-mentioned patents, notably, U.S. Pat. No. 5,917,320 and U.S. patent application Ser. No. 11/333,522, which, along with all of the above-mentioned patents, are incorporated by reference herein in their entirety.

Figure 1:
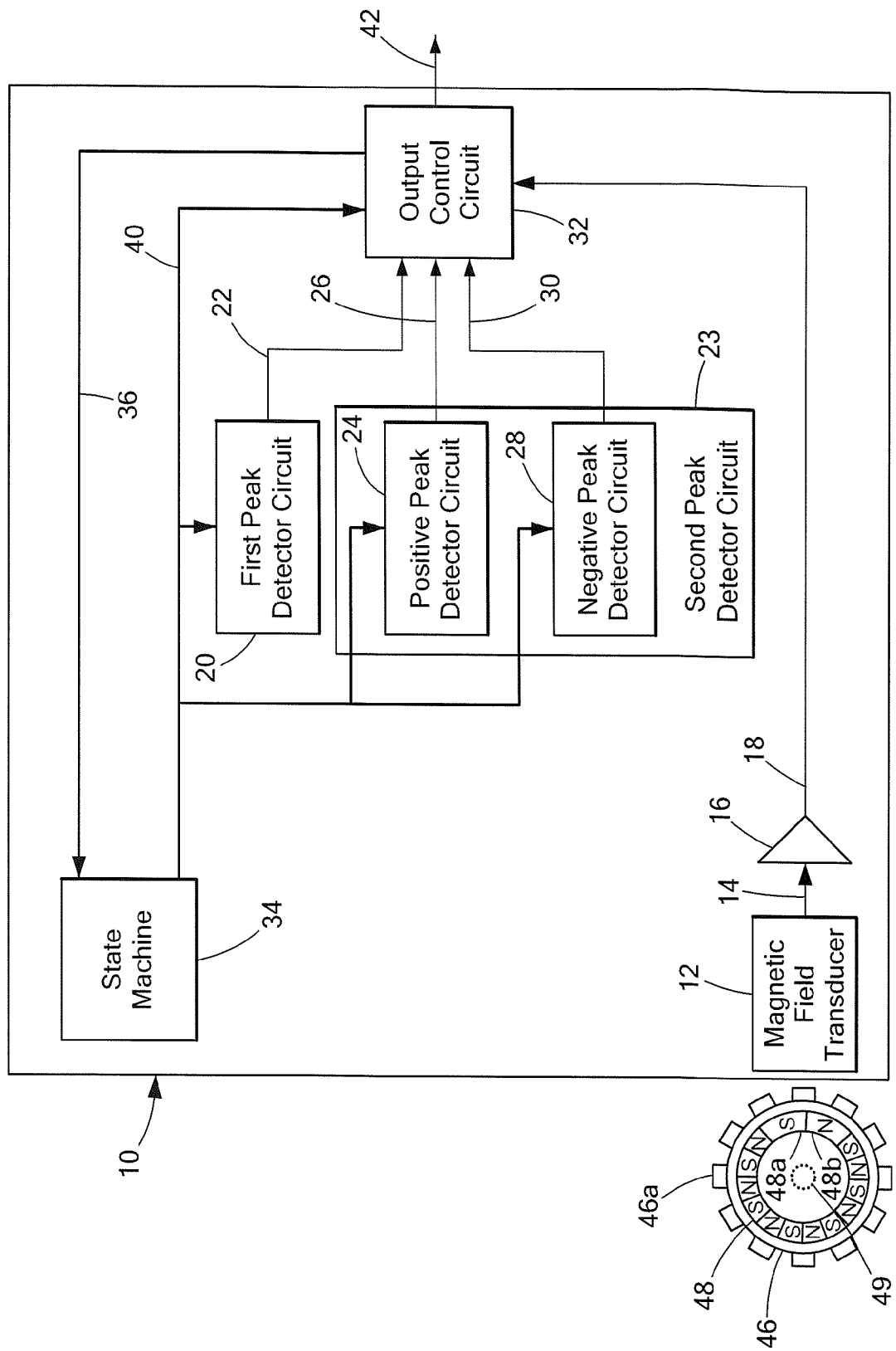
FIG. 1 is block diagram showing an integrated circuit proximity detector in accordance with the present invention having a magnetic field transducer, two peak detector circuits, and an output control circuit, the integrated circuit in proximity to a ring magnet having magnetic regions and a signature structure.

Referring to FIG. 1, an exemplary integrated circuit 10 (proximity detector) includes a magnetic field transducer 12. The magnetic field transducer 12 is responsive to proximity, and, in particular, to movement, of a ferrous or soft ferromagnetic object, for example, a gear 46. However, in other arrangements, the magnetic field transducer 12 can be responsive to movement of a magnet, for example, a ring magnet 48. In some particular arrangements, the ring magnet 48 and the gear 46 are coupled with a shaft 49. In these particular arrangements, the ring magnet 48 can be proximate to the magnetic field transducer 12, but the gear 46 need not be proximate to the magnetic field transducer 12.

The ring magnet 48 can have magnetic regions with alternating polarity labeled N and S. The ring magnet 48 can have a signature structure comprised of magnetic regions 48a, 48b, which are larger (or in other embodiments, smaller) than other ones of the magnetic regions. It should be appreciated that the magnetic field transducer 12 can respond differently to the signature structure 48a, 48b than to other ones of the magnetic regions, resulting in a so-called "signature region" in a magnetic field signal.

For embodiments in which only the gear 46 is sensed by the magnetic field transducer 12, in which case the ring magnet 48 is not needed, the gear 46 can also provide a signature region (not shown). For example, the gear 46 can have one or more gear teeth wider or narrower than the other gear teeth.

The magnetic field transducer 12 can be, but is not limited to, a Hall effect element, a magnetoresistance element, or a magnetotransistor. As is known, there are different types of Hall effect elements, for example, a planar Hall element, and a vertical Hall element. As is also known, there are different types of magnetoresistance elements, for example, a giant magnetoresistance (GMR) element, an anisotropic magnetoresistance element (AMR), a tunneling magnetoresistance (TMR) element, and a magnetic tunnel junction (MTJ).

The magnetic field transducer 12 is responsive to proximity of the ring magnet 48 and, in particular to proximity of passing magnetic regions N and S. In operation, the magnetic field transducer 12 produces an output signal 14 having a generally sinusoidal shape when the ring magnet 48 rotates, wherein each peak (positive and negative) of the sinusoid is associated with one of the magnetic regions N, S. In some arrangement as described above, the ring magnet 48 can also include the signature structure 48a, 48b, which tends to result in a higher or in a lower amplitude sinusoid cycle when the signature structure 48a, 48b passes proximate to the magnetic field transducer 12 as the ring magnet 48 rotates. It will become apparent from discussion below that the signature structure 48a, 48b and resulting signature region can be used to identify a particular absolute angular position of the ring magnet 48, which may be desirable in some applications, for example, when the ring magnet 48 is coupled to a gear associated with a cam shaft on an engine.

The integrated circuit 10 can include an amplifier 16 coupled to the magnetic field transducer 12, which produces an output signal 18, which is referred to herein as a "magnetic field signal." The output signal 18 is also sometimes referred to herein as a processed voltage (VPROC) signal.

First and second peak detector circuits 20 and 23, respectively are coupled to receive the magnetic field signal 18 from the amplifier 16. The first peak detector circuit 20 is responsive, during a determined time period described more fully below, to the magnetic field signal 18, and provides a first tracking signal 22, which, at different certain times, holds values corresponding to a positive peak of the magnetic field signal 18 and to a negative peak of the magnetic field signal 18.

The second peak detector circuit 23 is responsive, during the determined time period and also after the determined time period, to the magnetic field signal 18. The second peak detector circuit 23 provides a second tracking signal 26, which holds values corresponding to positive peaks of the magnetic field signal 18. The second peak detector circuit also provides a third tracking signal 30, which holds values corresponding to negative peaks of the magnetic field signal 18. Couplings between the magnetic field signal 18 and the first peak detector circuit 20 and second peak detector circuit 23 will become more apparent below from the discussion in conjunction with FIG. 2. Let it suffice here to say that the coupling is by way of signals 36 and 40.

The second peak detector circuit 23 can include a positive peak detector circuit 24 configured to the hold positive peaks of the magnetic field signal 18. The second peak detector circuit 23 can also include a negative peak detector circuit 28 configured to hold the negative peaks of the magnetic field signal 18.

It will be understood from discussion below in conjunction with FIGS. 2, 3, 4, and 4A that the second tracking signal 26 has an upward excursion limit and a downward excursion limit. The upward excursion limit of the second tracking signal 26 is smaller than the downward excursion limit of the second tracking signal 26. Therefore, the second tracking signal 26, which holds values corresponding to positive peaks of the magnetic field signal 18 can move more downward (also referred to herein as inward, i.e. toward the center of the magnetic field signal 18) and less upward (also referred to herein as outward, i.e. away the center of the magnetic field signal 18). It should be understood that, in some arrangements, the downward (i.e., inward) excursion limit of the second tracking signal 26 can be as large as the circuit architecture of the positive peak detector circuit 24 can allow. In other words, the downward excursion limit can be quite large and the second tracking signal 26 can move inwards quite far.

It will also be understood that the third tracking signal 30 has an upward excursion limit and a downward excursion limit. The upward excursion limit of the third tracking signal 30 is larger than the downward excursion limit of the third tracking signal 30. Therefore, the third tracking signal, which holds values corresponding to negative peaks of the magnetic field signal 18 can move more upward (also referred to herein as inward) and less downward (also referred to herein as outward). It should be understood that, in some arrangements, the upward (i.e., inward) excursion limit of the third tracking signal 30 can be as large as the circuit architecture of the negative peak detector circuit 28 can allow. In other words, the upward excursion limit can be quite large and the third tracking signal 30 can move inwards quite far. Thus, the second and third tracking signals 26, 30 are able to move more in one direction than in another direction.

The integrated circuit 10 can also include an output control circuit 32 coupled to the first and second peak detector circuits 20, 23, respectively, and also coupled to receive the magnetic field signal 18. The output control circuit 32 is configured to provide an output signal 42, which, during the determined time period, changes state in response to the first peak detector circuit 20, and which, after the determined time period, changes state in response to the second peak detector circuit 23.

As described above, at different certain times, the first tracking signal 22 holds values corresponding to a positive peak of the magnetic field signal 18 and to a negative peak of the magnetic field signal 18. During the determined time period, the changes of state occur in two directions according to the magnetic field signal 18 varying in two directions from the first tracking signal 22. As will be apparent from discussion below, edges in the output signal 42 occur near to a time when the first tracking signal 22 holds positive peaks and negative peaks of the magnetic field signal 18. Therefore, during the determined time period, the output signal 42 changes state near the positive and negative peaks of the magnetic field signal 18.

It will generally be understood from discussion below that, that, if the ring magnet 48 is already rotating, the determined time period generally begins shortly after a power-up time of the integrated circuit 10. Alternatively, if the ring magnet 48 is not already rotating when the integrated circuit 10 powers up, the determined time period begins shortly after the ring magnet 48 begins to rotate.

In some arrangements, the output control circuit 32 is configured to provide the output signal 42, which, during the determined time period, changes state when the magnetic field signal 18 varies from the first tracking signal 22 by a first predetermined amount. After the determined time period, the output signal 42 changes state when the magnetic field signal varies from the second tracking signal 26 by a first predetermined percentage of a difference between the second and third tracking signals, 26, 30, respectively. Also after the determined time period, the output signal 42 changes state again when the magnetic field signal 18 varies from the third tracking signal 30 by a second predetermined percentage of the difference between the second and third tracking signals, 26, 30, respectively. In some arrangements, the first and second percentages are the same. However, in other arrangements, they are different.

It will be understood from discussion below that the edge placement accuracy of the edges in the output signal 42 generated by the second peak detector circuit 23 after the determined time period can be more accurate than the edge placement accuracy of the edges in the output signal 42 generated by the first peak detector circuit 20 during the determined time period. A reason for the improved accuracy after the determined time period is that the thresholds used by the second peak detector circuit 23 after the determined time period have been calculated during the determined time period with knowledge of the signal properties of the magnetic field signal 18. During the determined time period, the magnetic field signal 18 is largely unknown.

The integrated circuit 10 can include a state machine 34 coupled to the first peak detector circuit 20, to the second peak detector circuit 23, and to the output control circuit 32. The state machine 34 can control the above-described determined time period. The state machine can switch the output control circuit 32 to use the first tracking signal 22 during the determined time period in order to generate the output signal 42 and to use the second and third tracking signals 26, 30, respectively, after the determined time period in order to generate the output signal 42.

The state machine 34 can receive a control signal 36, having one or more signal channels, from the output control circuit 32. In some arrangements, the determined time period, as determined by the state machine 34, begins after the second tracking signal 26 and the third tracking signal 30, which hold positive and negative peaks, respectively, of the magnetic field signal 18, differ by a second predetermined amount, which can be communicated to the state machine 34 by the control signal 36. It will be understood that the second tracking signal 26 and the third tracking signal 30 differ by the second predetermined amount only if a magnetic field signal 18 is present with a sufficient amplitude. For example, in some arrangements, the second and third tracking signals, 26, 30, respectively, which hold positive and negative peaks of the magnetic field signal, must differ by at least two hundred millivolts before the determined time period begins.

In some arrangements, the determined time period ends when the output signal 42, under control of the first peak detector circuit 20, has changed state a predetermined number of times, which can also be communicated to the state machine 34 by the control signal 36. The start and end of the determined time period are described more fully below in conjunction with FIGS. 4 and 4A.

In view of the above, it should be appreciated that the determined time period is determined by the integrated circuit 10 according to characteristics of the magnetic field signal 18. In particular, since the end of the determined time period is identified according to a predetermined number of edges (i.e., transitions) in the output signal 42, which edges correspond to peaks of the magnetic field signal 18, the determined time period can be long for a magnetic field signal 18 having a long period, and can be shorter for a magnetic field signal 18 having a shorter period.

As described above, during the determined time period, the output signal 42 is generated in accordance with the first peak detector circuit 20. After the determined time period, the output signal 42 is generated in accordance with the second peak detector circuit 23. Accordingly, during the determined time period, the first peak detector circuit 20 causes edges to be generated in the output signal 42 near the time of positive and negative peaks of the magnetic field signal 18. However, the accuracy of the placement in time of edges using the first peak detector circuit 20 is not as accurate as desired, in particular if the determined time period includes the above-described signature region within the magnetic field signal 18, e.g., if the integrated circuit 10 powers up when the signature structure 48a, 48b is near the magnetic field transducer 12, or if the ring magnet 48 begins rotating when the signature structure 48a, 48b is near the magnetic field sensor 12. The signature region of the magnetic field signal 18 has either higher or lower peaks than other portions of the magnetic field signal 18.

After the determined time period, the second peak detector circuit 23, in place of the first peak detector circuit 20, causes edges to be generated in the output signal 42 near the time that the magnetic field signal 18 crosses first and second thresholds corresponding to first and second percentages of the peak-to-peak amplitude of the magnetic field signal 18. It will be understood from discussion below, that after the determined time period, the accuracy of the placement in time of edges using the second peak detector circuit 23 can be more accurate than the placement of edges in time by the first peak detector circuit 20, in particular, in the presence of the signature region of the magnetic field signal 18, which cyclically occurs after the determined time period. However, the second peak detector circuit 23 can take longer to find the peaks of the magnetic field signal 18 than the first peak detector circuit 20, and therefore, may not be fully ready to operate and provide the output signal 42 during the determined time period. In essence, the second peak detector circuit 23 may be acquiring the peaks of the magnetic field signal 18 during the determined time period, but does not contribute to the output signal 42 until after the determined time period.

It will be understood from discussion below that the first peak detector circuit 20 can be a portion of a peak-referenced detector, which is described above. It will also be understood from discussion below that the second peak detector circuit 23 can be a portion of a peak-to-peak percentage detector, which is also described above. Other portions of the peak-referenced and peak-to-peak percentage detectors are within the output control circuit 32 as will be further apparent from discussion below in conjunction with FIGS. 2 and 3.

While the magnetic field transducer 12 is shown to be a part of the integrated circuit 10, in other arrangements, the magnetic field transducer 12 is on a separate semiconductor substrate from other portions of the integrated circuit 10, which are on another semiconductor substrate, in which case, the two substrates are coupled with bond wires or the like.

Figure 2:
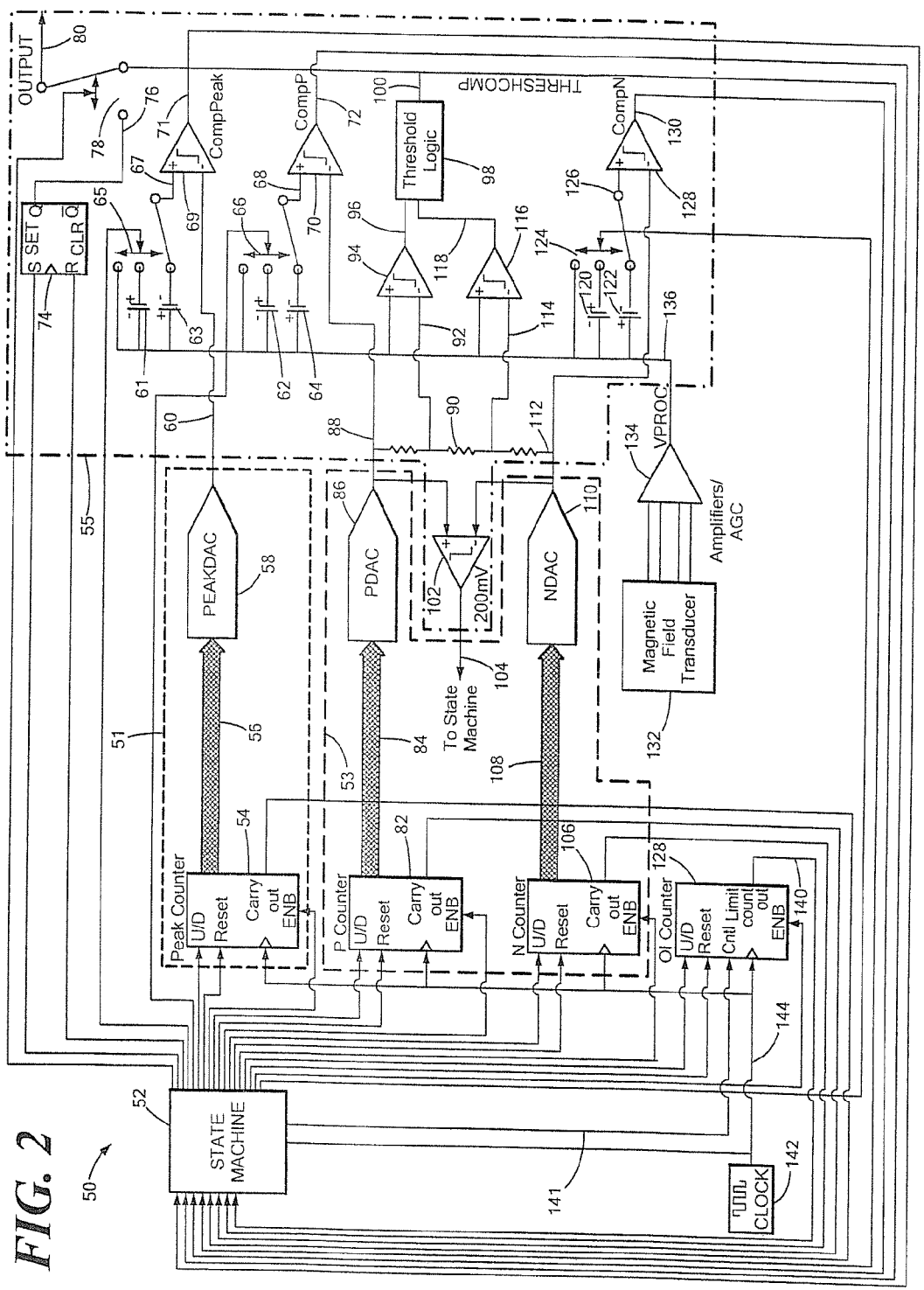
FIG. 2 is a block diagram showing further details of one embodiment of the integrated circuit of FIG. 1.

Referring now to FIG. 2, an integrated circuit 50 (proximity detector) is the same as or similar to the integrated circuit 10 of FIG. 1. The integrated circuit 50 includes a magnetic field transducer 132 coupled to an amplifier 134, which provides a magnetic field signal 136. The amplifier 134 can include one or more amplifiers and an automatic gain control (AGC). The integrated circuit 50 also includes a first peak detector circuit 51, and a second peak detector circuit 53. The integrated circuit 50 also includes an output control circuit 55 coupled to the first and second peak detector circuits 51, 53, respectively, and also coupled to receive the magnetic field signal 136. The integrated circuit 50 can also include a state machine 52 coupled to the first peak detector circuit 51, to the second peak detector circuit 53, and to the output control circuit 55. The magnetic field transducer 132, the amplifier 134, the first peak detector circuit 51, the second peak detector circuit 53, the output control circuit 55, and the state machine 52 can be the same as or similar to the magnetic field transducer 12, the amplifier 16, the first peak detector circuit 20, the second peak detector circuit 23, the output control circuit 32, and the state machine 34, respectively, of FIG. 1.

The first peak detector circuit 51 can provide a first tracking signal 60, which can be the same as or similar to the first tracking signal 22 of FIG. 1. The second peak detector circuit 53 can provide second and third tracking signals 88, 112, respectively, which can be the same as or similar to the second and third tracking signals 26, 30, respectively, of FIG. 1.

The first peak detector circuit 51 can include a first counter 54 (referred to herein as a Peak Counter) that provides an output signal 56 coupled to a first digital to analog converter (DAC) 58 (also referred to herein as a PEAKDAC). In some arrangements, the output signal 56 has nine bits. However, in other arrangements, the output signal 56 can have more than nine or fewer than nine bits. The first DAC 58 provides the first tracking signal 60, which is coupled to the output control circuit 55.

The first counter 54 can be configured to count in one direction during rising portions of the magnetic field signal 136 and configured to count in the other direction during falling portions of the magnetic field signal 136, causing the first tracking signal 60 to substantially track the magnetic field signal 136. The first counter 54 is coupled to receive a clock signal 144 from a clock source 142, and also an up/down (U/D) count direction control signal, an enable (ENB) signal, and a reset signal from the state machine 52. In some embodiments, the clock signal 144 is in the range of one to two megahertz. However, a clock signal 144 of any frequency can be used.

The second peak detector circuit 53 can include a second counter 82 (also referred to herein as a P Counter) that provides an output signal 84 coupled to a second DAC 86 (also referred to herein as a PDAC). In some arrangements, the output signal 84 has nine bits. However, in other arrangements, the output signal 84 can have more than nine or fewer than nine bits. The second DAC 86 provides the second tracking signal 112, which is coupled to the output control circuit 55.

The second counter 82 is configured to count in either direction so that the second tracking signal 88 can achieve a value corresponding to a positive peak of the magnetic field signal 136. The second counter 82 has an upward count number limit associated with an upward excursion limit of the second tracking signal 88 and a downward count number limit associated with a downward excursion limit of the second tracking signal 88. The upper count number limit of the second counter 82 is smaller than the downward count number limit of the second counter. This difference in upward and downward count number limits result in the second counter 82 being able to count further downward than upward. Therefore, the second tracking signal 88 provided by the PDAC 86 can move more downward than upward. From discussion above, it will be understood that, in some arrangements, the downward count number limit of the second counter 82 can be limited only by the hardware architecture of the second counter 82, i.e., it can count all the way down to zero.

The second counter 82 is coupled to receive the clock signal 144 from the clock source 142, and also an up/down (U/D) count direction control signal, an enable (ENB) signal, and a reset signal from the state machine 52.

The second peak detector circuit 53 also includes a third counter 106 (also referred to herein as an N Counter) that provides an output signal 108 coupled to a third DAC 110 (also referred to herein as an NDAC). In some arrangements, the output signal 108 has nine bits. However, in other arrangements, the output signal 108 can have more than nine or fewer than nine bits. The third DAC 110 provides the third tracking signal 112, which is coupled to the output control circuit 55.

The third counter 106 is configured to count in either direction so that the third tracking signal 112 can achieve a value corresponding to a negative peak of the magnetic field signal 136. The third counter 106 has an upward count number limit associated with an upper excursion limit of the third tracking signal 112 and a downward count number limit associated with a downward excursion limit of the third tracking signal 112. The upward count number limit of the third counter is larger than the downward count number limit of the third counter, which is the opposite of that described above in conjunction with the second counter 82. This difference in upward and downward count number limits result in the third counter 106 being able to count farther upward than downward. Therefore, the third tracking signal 112 provided by the NDAC 110 can move more upward than downward, which is the opposite of that described above in conjunction with the second tracking signal 88. From discussion above, it will be understood that, in some arrangements, the upward count number limit of the third counter 106 can be limited only by the hardware architecture of the third counter 106, i.e., it can count all the way up to a maximum count corresponding to a number of bits in the output signal 108.

The third counter 106 is coupled to receive the clock signal 144 from the clock source 142, and also an up/down (U/D) count direction control signal, an enable (ENB) signal, and a reset signal from the state machine 52.

The output control circuit 55 can include a comparator 69, which can compare the first tracking signal 60 to the magnetic field signal 136, to the magnetic field signal 136 offset by a positive voltage represented by a positive voltage source 61, or to the magnetic field signal 136 offset by a negative voltage represented by a negative voltage source 63, all under control of a switch 65 controlled by the state machine 52. The positive and negative voltage sources 61, 63, respectively, can provide approximately the same voltage, but can have opposite polarities, each of which is sometimes referred to as a "first predetermined amount" herein. The comparator 69 provides an output signal 71 that is communicated to the state machine 52. Operation of the signal 71 will be more fully understood from discussion below in conjunction with FIGS. 4 and 4A.

The signal 71 is fed back to the state machine 52, which, in turn, generates set and rest reset signals to a latch 74, which, in turn generates an output signal 76. During the above-described determined time period, the output signal 76 is directed through the switch 78 to provide the output signal 80, which is under control of the state machine 52.

The output control circuit 55 can also include a comparator 70, which can compare the second tracking signal 88 to the magnetic field signal 136, to the magnetic field signal 136 offset by a positive voltage represented by a positive voltage source 62, or to the magnetic field signal 136 offset by a negative voltage represented by a negative voltage source 64, all under control of a switch 66 controlled by the state machine 52. The positive and negative voltage sources 62, 64, respectively, can provide approximately the same voltage, but can have opposite polarities, each of which is sometimes referred to as the above-described "first predetermined amount." The comparator 70 provides an output signal 72 that is communicated to the state machine 52. Operation of the signal 72 will be more fully understood from discussion below in conjunction with FIGS. 4 and 4A. In some arrangements, the voltage source 64 is not used.

The output control circuit 55 can also include a comparator 128, which can compare the third tracking signal 112 to the magnetic field signal 136, to the magnetic field signal 136 offset by a positive voltage represented by a positive voltage source 120, or to the magnetic field signal 136 offset by a negative voltage represented by a negative voltage source 122, all under control of a switch 124 controlled by the state machine 52. The positive and negative voltage sources 120, 122, respectively, can provide approximately the same voltage, but can have opposite polarities, each of which is sometimes referred to as the above-described "first predetermined amount." The comparator 128 provides an output signal 130 that is communicated to the state machine 52. Operation of the signal 130 will be more fully understood from discussion below in conjunction with FIGS. 4 and 4A. In some arrangements, the voltage source 120 is not used.

The output control circuit 55 can also include a resistor ladder 90 coupled at one end to receive the second tracking signal 88 and coupled at the other end to receive the third racking signal 112. The resistor ladder 90 provides an upper output tap signal 92 and a lower output tap signal 114. The upper and lower output tap signals 92, 114, respectively, correspond to an upper and a lower threshold, respectively, to which the magnetic field signal 136 can be compared via comparators 94 and 116, respectively. It should also be understood that the upper threshold corresponds to a first percentage of a difference between the second and third tracking signals 88, 112, respectively, which difference corresponds to a peak-to-peak amplitude of the magnetic field signal 136. It should also be understood that the lower threshold corresponds to a second percentage of the difference between the second and third tracking signals 88, 112, respectively.

In one particular arrangement, the first percentage is about eighty five percent and the second percentage is about fifteen percent. In some other arrangements, the first and second percentages are each about fifty percent. However, in other arrangements, other percentages in the range of about ninety-nine to one percent can be used.

Therefore, the comparator 94 provides an output signal 96 having edges corresponding to a time when the magnetic field signal 136 crosses the first threshold corresponding to the upper output tap signal 92. Similarly, the comparator 116 provides an output signal 118 having edges corresponding to a time when the magnetic field signal 136 crosses the second threshold corresponding to the lower output tap signal 114.

A threshold logic circuit 98 combines the output signals 96, 118 and generates a THRESHCOMP signal 100 having edges corresponding to times when the magnetic field signal 136 crosses each of the first and second threshold associated with the upper output tap signal 92 and lower output tap signal 114, respectively. Therefore, the THRESHCOMP signal 100 can have edges representative of rotation of the ring magnet 48 of FIG. 1.

After the above-described determined time period, the THRESHCOMP signal 100 is directed through the switch 78 to provide the output signal 80, which is under control of the state machine 52. Therefore, during the determined time period, the switch 78 is set to direct the output signal 76 from the latch 74 to provide the output signal 80, and after the determined time period, the switch 78 is set to direct the THRESHCOMP signal 100 to provide the output signal 80. Operation during the determined time period is referred to herein as a "calibration mode" and operation after the determined time period is referred to herein as a "running mode."

The output control circuit 55 can also include a comparator 102 having an input coupled to the second tracking signal 88 and another input coupled to the third tracking signal 112. An output 104 generated by the comparator 102 is indicative of a magnitude of a difference between the first and second tracking signal 88, 112, respectively, (i.e., a peak-to-peak amplitude of the magnetic field signal 136) being greater than a "second predetermined amount," for example, two hundred millivolts. In other words, the output signal 104 from the comparator 102 changes state when the peak-to-peak magnitude of the magnetic field signal 136 becomes larger than the second predetermined amount, e.g., two hundred millivolts.

It will become apparent from the discussion below in conjunction with FIG. 4, that a change of state of the signal 104, indicative of the peak-to peak magnitude of the magnetic field signal 136 being greater than the second predetermined amount, is indicative of the start of the above-described determined time period. In other words, the determined time period does not begin until the integrated circuit 50 is powered up and until the ring magnet 48 of FIG. 1 is rotating in such a way that it can generate the magnetic field signal 136.

The integrated circuit 50 can include a fourth counter 128 (also referred to herein as an OI counter) coupled to receive the clock signal 144 from the clock source 142, and also a control signal (Cntl), an up/down (U/D) count direction control signal, an enable (ENB) signal, and a reset signal from the state machine 52. The fourth counter 128 can return a limit count output signal 140 to the state machine 52. It will become apparent from the discussion below in conjunction with FIG. 4A, that the limit count output signal 140 is indicative of the end of the determined time period.

While the magnetic field transducer 132 is shown to be a part of the integrated circuit 50, in other arrangements, the magnetic field transducer 132 is on a separate semiconductor substrate from other portions of the integrated circuit 50, which are on another semiconductor substrate, in which case, the two substrates are coupled with bond wires or the like.

Figure 3:
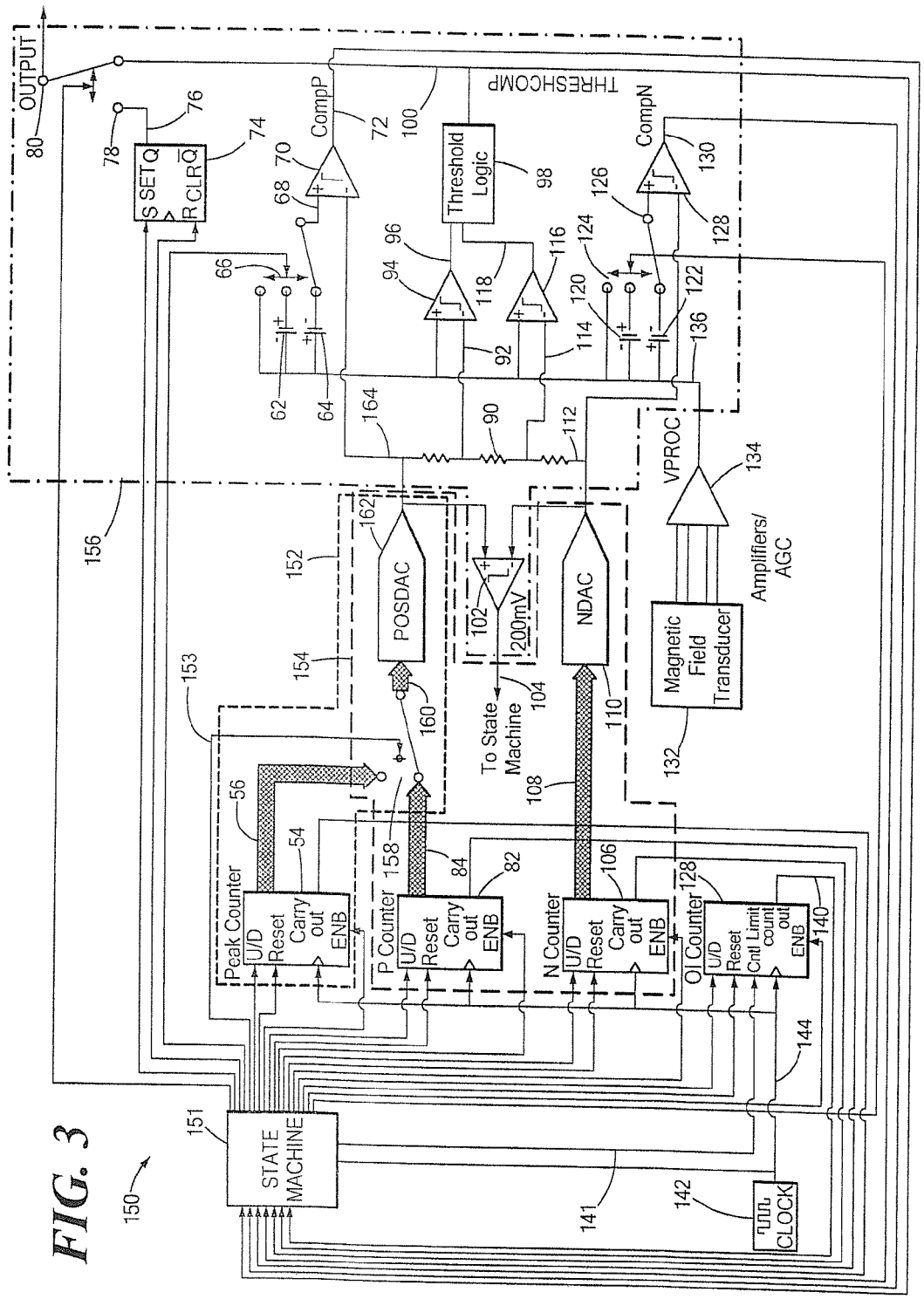
FIG. 3 is a block diagram showing further details of another embodiment of the integrated circuit of FIG. 1.

Referring now to FIG. 3, in which like elements of FIG. 2 are shown having like reference designations, an integrated circuit 150 (proximity detector) differs from the integrated circuit 50 of FIG. 2 in that the two DACs 58, 86 of FIG. 2 are replaced by one DAC 162, which is referred to herein as a POSDAC. Essentially, the POSDAC 162 is multiplexed via a switch 158 to receive the output signals 54, 82 from the first and second counters 54, 82, respectively, at different times. Therefore, the integrated circuit 150 includes a first peak detector circuit 152 and a second peak detector circuit 154, which share the POSDAC 162. The integrated circuit 150 also includes an output control circuit 156, similar to the output control circuit 55 of FIG. 2, differing in that the output control circuit 156 receives a signal 164 from the POSDAC 162, rather than the first and second tracking signals 60, 88, respectively of FIG. 2. The signal 164 provides the first and second tracking signals at different times. The output control circuit 156 is also missing the comparator 69 and associated components that are present in FIG. 2.

Operation of the integrated circuit 150 is similar to operation of the integrated circuit 50 of FIG. 2, except that a state machine 151, unlike the state machine 52 of FIG. 2, also controls operation of the switch 158, by way of a control signal 153, resulting in the above-described multiplexing between the two counters 54, 82. Operation of the integrated circuit 150 is described more fully below in conjunction with FIGS. 4 and 4A.

While the magnetic field transducer 132 is shown to be a part of the integrated circuit 150, in other arrangements, the magnetic field transducer 132 is on a separate semiconductor substrate from other portions of the integrated circuit 150, which are on another semiconductor substrate, in which case, the two substrates are coupled with bond wires or the like.

Figure 4:
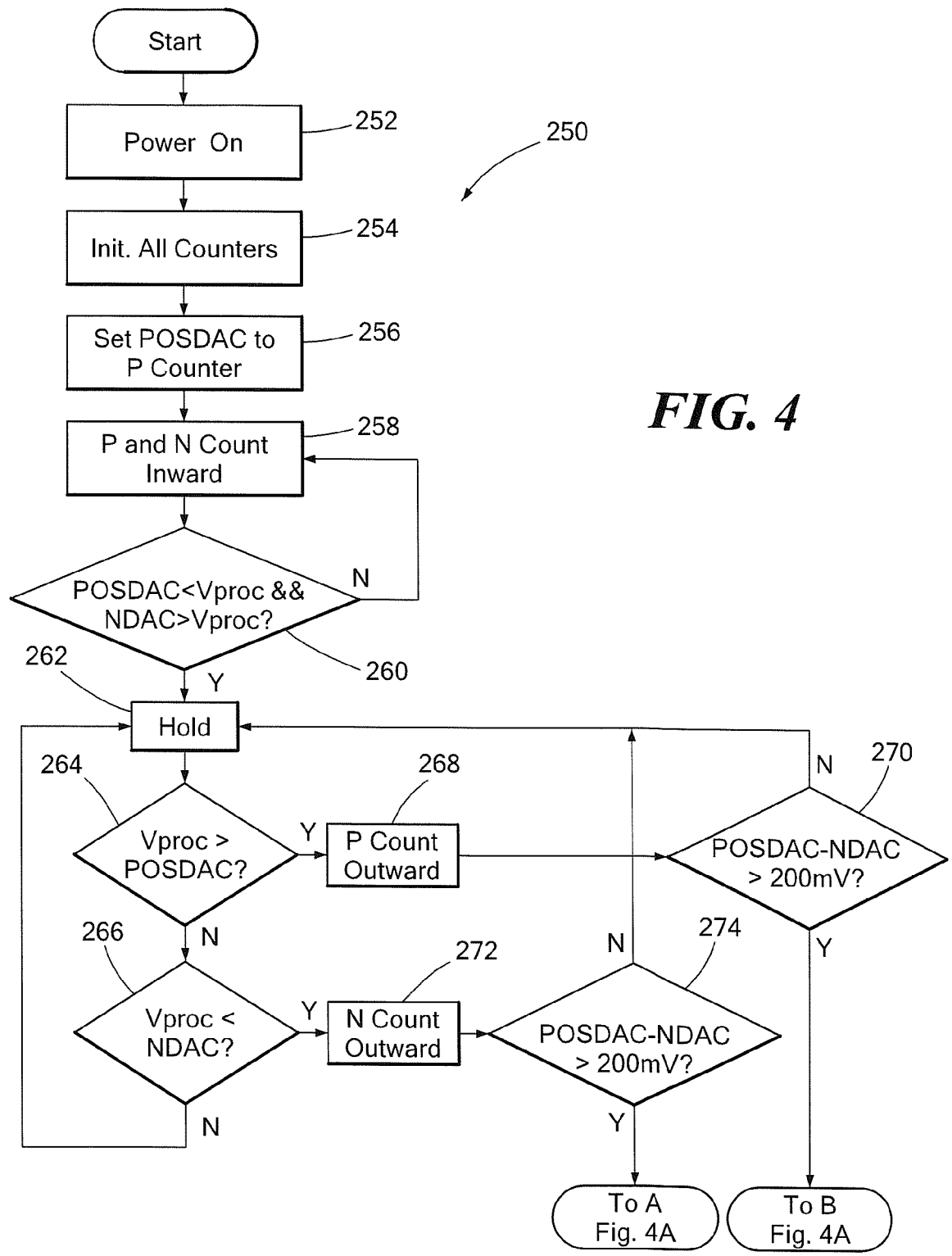
FIGS. 4 and 4A together form a flow chart showing a method by which the integrated circuit of FIGS. 1, 2, and 3 can operate.
Figure 4A:
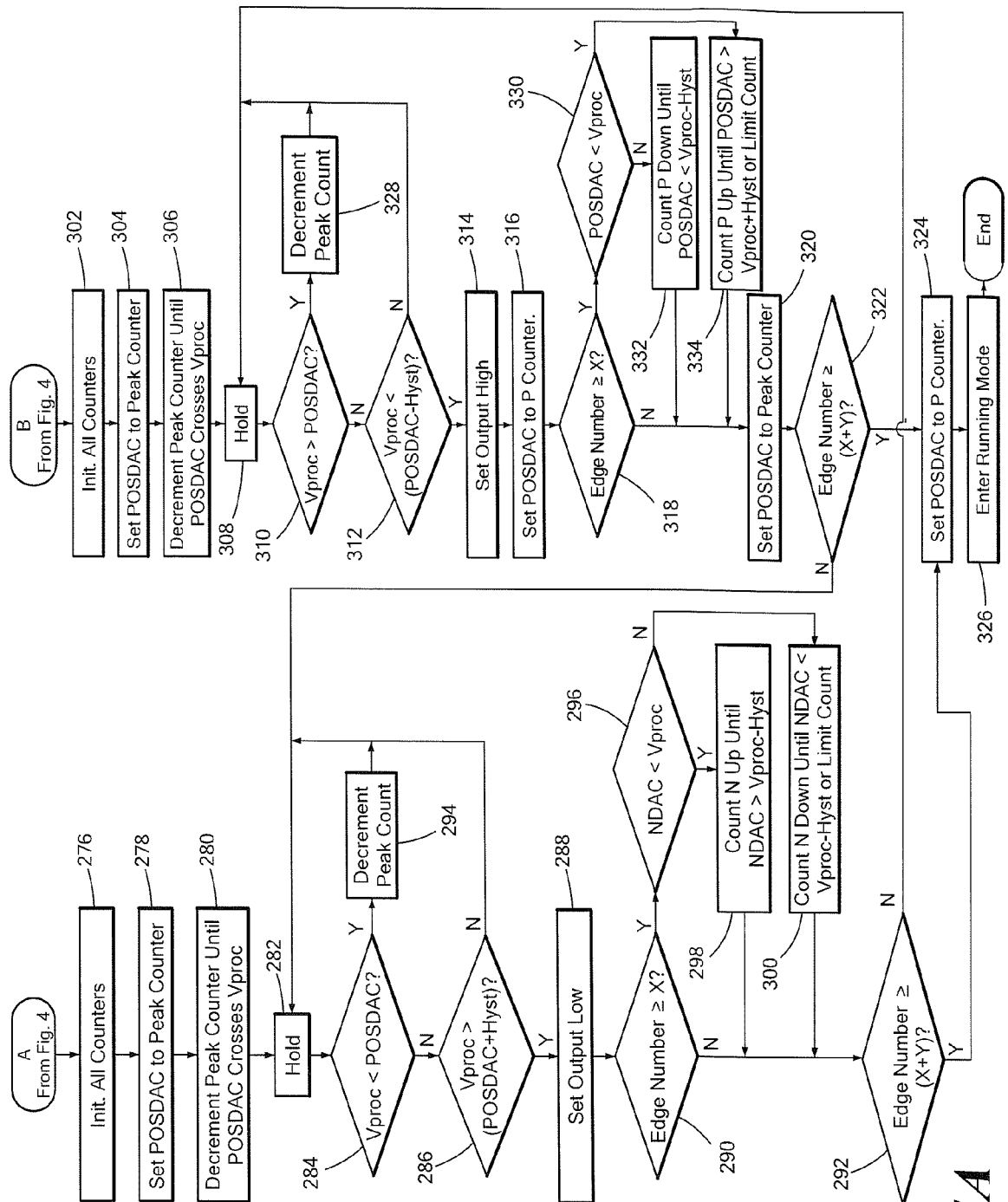

It should be appreciated that FIGS. 4 and 4A show flowcharts corresponding to the below contemplated technique, which would be implemented in an integrated circuit, for example, the integrated circuit 150 (FIG. 3). Rectangular elements (typified by element 252 in FIG. 4), herein denoted "processing blocks," represent computer software instructions or groups of instructions. Diamond shaped elements (typified by element 260 in FIG. 4), herein denoted "decision blocks," represent computer software instructions, or groups of instructions, which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the invention. Thus, unless otherwise stated the blocks described below are unordered meaning that, when possible, the steps can be performed in any convenient or desirable order.

Referring now to FIGS. 4 and 4A, an exemplary method 250 begins at block 252, where an integrated circuit, for example, the integrated circuit 150 of FIG. 3, is powered on. In describing the process 250, continual reference is made to elements of FIG. 3, for clarity. Until the very end of the process 250 of FIGS. 4 and 4A, the integrated circuit 150 is in a so-called "calibration mode." Referring to the integrated circuit 150 of FIG. 3, when in the calibration mode, the output signal 80 provided by the integrated circuit 150 is provided by the state machine 151 via the latch 74, wherein the output 76 of the latch 74 is directed through the switch 78. As described more fully below, at the end of the process 250, the integrated circuit 150 enters a so-called "running mode," during which the output signal 80 provided by the integrated circuit 150 is provided instead by the threshold logic circuit 98, which provides the THRESHCOMP signal 100 directed through the switch 78.

At block 254, all of the counters, for example the counters 54, 82, 106, 128 are set to respective initial conditions. The peak counter 54 can be set to a minimum count value (e.g., zero), the P counter 82 can be set to a maximum count value (e.g., five hundred eleven), the N counter 106 can be set to a minimum count value (e.g., zero), and the OI counter 128 can be set to a minimum count value (e.g., zero).

At block 256, the switch 158 of FIG. 3 is directed by the state machine 151 to provide the output signal 84 from the P counter 82 to the POSDAC 162. At block 258, upon control signals applied by the state machine 151 to the reset, enable (ENB), and up/down (U/D) ports of the counters 82 and 106 by the state machine 151, in response to the clock signal 144, the P counter 82 counts downward and the N counter 106 counts upward at the same time. The number of cycles of the clock signal 144 that are counted can be controlled, for example, by controlling the enable signals applied by the state machine 151 to the counters 82, 106. In some arrangements, at block 258, the counters 82, 106 count only one of the cycles of the clock signal 144. In other arrangements, at block 258, the counters 82, 106 count a burst (e.g., ten) of the cycles of the clock signal 144. Since the P counter 82 is initialized to a maximum count value and the N counter is initialized to a minimum count value, it will be recognized that the two counters each count "inward," i.e., toward a value between the maximum count value and the minimum count value.

At block 260, output signals 164, 112 provided by the POSDAC 162 and NDAC 110, respectively, are tested. At block 260, if the output signal 164 provided by the POSDAC 162 is less than the magnetic field signal (VPROC) 136 provided by the amplifier 134, as indicated by the comparator 70, and also if the output signal 112 provided by the NDAC 110 is greater than the magnetic field signal 136 provided by the amplifier 134, as indicated by the comparator 128, then, in response to a change of state in the output signals 72, 130 received by the state machine 151, the counters 82, 106 stop counting at block 262. It should be recognized that one of the counters 82, 106 can have counted a bit too far inward, i.e., beyond the magnetic field signal 136, since the above two conditions must be met before counting stops.

At block 264, the output signal 164 from the POSDAC 162 is again tested. If the magnetic field signal 136 is larger than the output signal 164 from the POSDAC 162, as indicated by the comparator 70, then the P counter 82 has counted a bit too far downward (inward from a positive maximum), and the process continues to block 268 in order to move the POSDAC signal 164 upward (outward). Therefore, at block 268, the P counter 82 reverses direction and counts upward (outward). As described above, the P counter 82 can count a single cycle of the clock signal 144 or a burst of cycles of the clock signal 144. At block 270, a difference between the outputs 88, 112 of the POSDAC 162 and the NDAC 110, respectively, is tested, for example, by the comparator 102 of FIG. 3. If the difference is greater than a "difference threshold value," for example, 200 millivolts, then the process 250 proceeds to block 302 of FIG. 4A. This condition will be understood to be indicative of the presence of a magnetic field signal 136 (FIG. 3) of sufficient amplitude, which is further indicative of the ring magnet 48 (FIG. 1) rotating. It will become apparent that if the ring magnet 48 is not rotating, the process 250 can remain looping within blocks 258-274, not proceeding to the block 302 of FIG. 4A until the ring magnet 48 begins to rotate.

At block 270, if the difference between the outputs 88, 112 of the POSDAC 162 and the NDAC 110, respectively, is not larger than the difference threshold value, then the process returns to block 262, and returns then to block 264. At block 264, if the magnetic field signal 136 is not greater than the output signal 164 provided by the POSDAC 162, then the process continues to block 266. This condition is indicative of the POSDAC 162 providing an output signal 164 near a positive peak of the magnetic field signal 136.

At block 266, the output signal 112 from the NDAC 110 is again tested. If the magnetic field signal 136 is smaller than the output signal 112 from the NDAC 110, as indicated by the comparator 128, then the N counter 106 has counted a bit too far, and the process continues to block 272 in order to move the NDAC signal 112 downward (outward). Therefore, at block 272, the N counter 106 reverses direction and counts downward (outward). As described above, the N counter 106 can count a single cycle of the clock signal 144 or a burst of cycles of the clock signal 144. At block 274, the difference between the outputs 88, 112 of the POSDAC 162 and the NDAC 110, respectively, is again tested, for example, by the comparator 102 of FIG. 3. If the difference is greater than the above-described difference threshold value, for example, 200 millivolts, then the process 250 proceeds to block 276 of FIG. 4A. As described above, this condition will be understood to be indicative of the presence of a magnetic field signal 136 (FIG. 3) of sufficient amplitude, which is further indicative of the ring magnet 48 (FIG. 1) rotating. If the ring magnet 48 is not rotating, the process 250 can remain looping within blocks 258-274, not proceeding to the block 276 of FIG. 4A until the ring magnet 46 begins to rotate.

It should be appreciated that an exit from FIG. 4 to FIG. 4A by way of block 270 is indicative of the magnetic field signal 136 being in a certain condition. Namely, the magnetic field signal 136 is approaching a positive peak and the magnetic field signal 136 is, therefore, experiencing a positive slope.

It should be appreciated that exit of FIG. 4 to FIG. 4A by way of block 274 is also indicative of the magnetic field signal 136 being in a certain condition. Namely, the magnetic field signal 136 is approaching a negative peak and the magnetic field signal 136 is, therefore, experiencing a negative slope.

If at block 266 the magnetic field signal 136 is not less than the output signal 12 provided by the NDAC 110, the process returns to block 262.

Referring now to FIG. 4A, which continues the process 250 of FIG. 4, beginning at entry point A from FIG. 4, the process continues at block 276 where the counters 54, 82, 106, 128 are each set to their initial conditions described above in conjunction with block 254. Recall from the above discussion in conjunction with FIG. 4 that the magnetic field signal 136 must be experiencing a negative slope region if the entry to FIG. 4A is at entry point A.

At block 278, the switch 158 of FIG. 3 is directed to provide the output signal 56 from the peak counter 54 to the POSDAC 162. At block 280, the peak counter 54 is decremented (either by a single cycle of the clock signal 144 or by a burst of cycles of the clock signal 144 as described above), until the output signal 164 provided by the POSDAC 162 crosses (is equal to or less than) the magnetic field signal 136. At block 282, the decrementing stops.

At block 284, the output signal 164 (i.e., the first tracking signal at this time) provided by the POSDAC 162 is tested, for example, with the comparator 70. If the magnetic field signal 136 is less than the output signal 164, then the process proceeds to block 294, where the peak counter 54 is further decremented and the process returns to block 282. If the magnetic field signal 136 is not less than the output signal 164, then the process 250 proceeds to block 286. It should be appreciated that the loop of blocks 284, 294, 282 can result in the output signal 164 (which is acting as the first tracking signal), tracking the magnetic field signal 136 downward to a negative peak, whereupon the output signal 164 holds a value corresponding to the negative peak.

At block 286, the output signal 164 provided by the POSDAC 162 is still further tested, for example, with the comparator 70. The test of block 286 attempts to find when the magnetic field signal has moved past a negative peak and has risen by a predetermined amount. For the test of block 286, the switch 66 is directed to the negative voltage source 64, so that the output signal 164 provided by the POSDAC 162 is compared with an offset version of the magnetic field signal 136, offset by a "predetermined hysteresis value." Therefore, at block 286, if the magnetic field signal 136 is not greater than the output signal 164 (holding a negative peak value) plus the hysteresis value, then the process returns to block 282. However, if the magnetic field signal 136 is greater than the output signal 164 plus the hysteresis value, then the process proceeds to block 288, where the output signal 80 is set low by the latch 74, which is under control of the state machine 151. The test of block 286 essentially detects when the magnetic field signal 136 and the held negative peak of the magnetic field signal 136, held by the output signal 164, differ by the predetermined hysteresis value, for example, one hundred millivolts.

At block 290, if the number of edges provided by the state machine 151 in the output signal 80 is greater than or equal to a first "predetermined count value" (X) (e.g., two), then the output signal 112 provided by the NDAC 110 is tested at block 296. At block 296, if the output signal 112 provided by the NDAC 110 is less than the magnetic field signal 136, as indicated by the comparator 128, then the process continues to block 298, where the N counter 106 is counted upward (inward) until the output signal 112 provided by the NDAC 110 is greater than the magnetic field signal 136 minus the above described hysteresis value, as indicated also by the comparator 128 when coupled to the magnetic field signal 136 via the negative voltage source 122. When the counting of block 298 is finished, the process continues at block 292.

At block 296, if the output signal 112 provided by the NDAC 110 is not less than the magnetic field signal 136, as indicated by the comparator 128, then the process continues to block 300, where the N counter 106 is counted downward (outward) until the output signal 112 provided by the NDAC 110 is less than the magnetic field signal 136 minus the above described hysteresis value, as indicated also by the comparator 128 when coupled to the magnetic field signal 136 via the negative voltage source 122. However, when counting downward (outward), the number of counts provided by the N counter 106 cannot exceed a predetermined limit count, also referred to as a "downward count number limit." When the counting of block 300 is finished, the process continues at block 292.

Blocks 296, 298, 300 attempt to cause the N counter 106 to achieve a count value approximately equal to that of the Peak Counter 54, which has held a negative peak of the magnetic field signal 136. In the above-described arrangement, the magnetic field signal has progressed beyond its negative peak value by the predetermined hysteresis value at the time that blocks 296, 298, 300 are performed. Thus, blocks 298 and 300 count only to the present value of the magnetic field signal 136 minus the predetermined hysteresis value in order to acquire a count value corresponding to the negative peak of the magnetic field signal 136. In other arrangements, instead of the counting and testing of the N counter at blocks 290, 296, 298, 300, the count value held in the Peak counter 54, which is indicative of the negative peak of the magnetic field signal 136, could be directly transferred to the N counter 106, but with the count number limit of block 300, to achieve a similar result.

With the arrangement of blocks 298 and 300, it should be understood that the N counter 106 can count upward (inward) as far as necessary, limited only by the hardware architecture of the N counter 106, but can only count downward (outward) by an amount limited by the downward count number limit. However, in other arrangements, the upward count performed at block 298 can also be limited to be no greater than an upward count number limit. In both of these arrangements, the downward count limit of block 300 is less than the upward count limit employed in block 298. In the case of either block 298 or 300, the output signal 112 provided by the NDAC 110 ends up having a value approximately equal a negative peak value of the magnetic field signal 136.

Blocks 290, 296, 298, and 300 will be recognized to be steps that result in bringing the NDAC 110 toward the negative peak of the magnetic field signal 136, but controlled so as to update upward without limit (referred to herein as an "upward excursion limit"), or with a relatively large limit, in the inward direction, but also controlled to have a limited update (referred to herein as a downward excursion limit) in the outward direction. It will become apparent from discussion below that, with this arrangement, the NDAC 110 is less influenced by a signature region in the magnetic field signal 136.

At block 290, if the number of edges provided by the state machine 151 in the output signal 80 is not greater than or equal to the first predetermined count value (X) (e.g., two), then the process continues to block 292. At block 292, if the number of edges provided by the state machine 151 in the output signal 86 is greater than or equal to the first predetermined count value (X) plus a second predetermined count value (Y), the process continues to block 324.

At block 324, the output signal 84 of the P counter 82 is connected to the POSDAC 162 via the switch 158. At block 326, the circuit 150 begins the running mode. It should be apparent that the running mode is not achieved until the condition of block 292 is met, namely, the number of edges provided by the state machine 151 in the output signal 86 is greater than or equal to the first predetermined count value (X) plus the second predetermined count value (Y). Thus, when the first entry is at entry point A, the method 250 must flow to block 308 at least once. However, block 308 and subsequent blocks are discussed below in the context of having arrived instead from FIG. 4 via entry point B.

Beginning at entry point B from FIG. 4, the process 250 continues at block 302 where the counters 54, 82, 106, 128 are each set to their initial conditions described above in conjunction with block 254. Recall from the above discussion in conjunction with FIG. 4 that the magnetic field signal 136 must be experiencing a positive slope region, approaching a positive peak, if the entry to FIG. 4A is at entry point B.

At block 304, the switch 158 of FIG. 3 is directed to provide the output signal 56 from the peak counter 54 to the POSDAC 162. At block 306, the peak counter 54 is decremented (either by a single cycle of the clock signal 144 or by a burst of cycles of the clock signal 144 as described above), until the output signal 164, operating as the first tracking signal, provided by the POSDAC 162 crosses (is equal to or less than) the magnetic field signal 136. At block 308, the decrementing stops.

At block 310, the output signal 164 provided by the POSDAC 162 is tested, for example, with the comparator 70. If the magnetic field signal 136 is greater than the output signal 164, then the process proceeds to block 328, where the peak counter 54 is incremented and the process returns to block 308. If the magnetic field signal 136 is not greater than the output signal 164 at block 310, then the process 250 proceeds to block 312. It should be appreciated that the loop of blocks 310, 328, 308 can result in the output signal 164 (which is acting as the first tracking signal), tracking the magnetic field signal 136 upward to a positive peak, whereupon the output signal 164 holds a value corresponding to the positive peak.

At block 312, the output signal 164 provided by the POSDAC 162 is still further tested, for example, with the comparator 70. However, in this test, the switch 66 is directed to the positive voltage source 62, so that the output signal 164 provided by the POSDAC 162 is compared with an offset version of the magnetic field signal 136, offset by the "predetermined hysteresis value." Therefore, at block 312, if the magnetic field signal 136 is not less than the output signal 164 holding a positive peak value minus the hysteresis value, then the process returns to block 308. If the magnetic field signal 136 is less than the output signal 164 minus the hysteresis value, then the process proceeds to block 314, where the output signal 80 of FIG. 3 is set high by the latch 74, which is under control of the state machine 151. The test of block 312 essentially detects when the magnetic field signal 136 and the held positive peak of the magnetic field signal 136 differ by the predetermined hysteresis value, for example, one hundred millivolts.

At block 316, the switch 158 of FIG. 3 is directed to provide the signal 84 from the P counter 82 to the POSDAC 162, in which case the output signal 164 acts as the second tracking signal.

At block 318, if the number of edges provided by the state machine 151 in the output signal 80 is greater than or equal to the above-described first "predetermined count value" (X) (e.g., two), then the output signal 164 provided by the POSDAC 162 is tested at block 330. At block 330, if the output signal 164 provided by the POSDAC 162 is not less than the magnetic field signal 136, as indicated by the comparator 70, then the process continues to block 332, where the P counter 82 is counted downward (inward) until the output signal 164 provided by the POSDAC 162 is less than the magnetic field signal 136 plus the above described hysteresis value, as also indicated by the comparator 70 when coupled to the magnetic field signal 136 via the positive voltage source 62. When the counting of block 332 is finished, the process continues at block 320.

At block 330, if the output signal 164 provided by the POSDAC 162 is less than the magnetic field signal 136, as indicated by the comparator 70, then the process continues to block 334, where the P counter 82 is counted upward (outward) until the output signal 164 provided by the POSDAC 162 is greater than the magnetic field signal 136 plus the above described hysteresis value, as also indicated by the comparator 70 when coupled to the magnetic field signal 136 via the positive voltage source 62. However, when counting upward (outward), the number of counts provided by the P counter 82 cannot exceed a predetermined limit count, also referred to herein as an "upward count number limit." When the counting of block 334 is finished, the process continues at block 320.

With the arrangement of blocks 332 and 334, it should be understood that the P counter 82 can count downward (inward) as far as necessary, limited only by the hardware architecture of the p counter 82, but can only count upward (outward) by an amount limited by the upward count number limit. However, in other arrangements, the downward (inward) count performed at block 332 can also be limited to be no greater than a downward count number limit. In these embodiments, the upward count limit of block 334 is less than the downward count limit of block 332. In the case of either block 332 or 334, the output signal 164 provided by the POSDAC 162 ends up being approximately equal to the positive peak value of the magnetic field signal 136.

Blocks 330, 332, and 334 attempt to cause the P counter 82 to achieve a count value approximately equal to that of the Peak Counter 54, which has held a positive peak of the magnetic field signal 136. In the above-described arrangement, the magnetic field signal 136 has progressed beyond its positive peak value by the predetermined hysteresis value at the time that blocks 330, 332, and 334 are performed. Thus, blocks 332 and 334 count only to the present value of the magnetic field signal 136 plus the predetermined hysteresis value in order to acquire a count value corresponding to the positive peak of the magnetic field signal 136. In other arrangements, instead of the counting and testing of the P counter at blocks 318, 330, 332, an 334, the count value held in the Peak counter 54, which is indicative of the positive peak of the magnetic field signal 136, could be directly transferred to the P counter 182, but with the count number limit of block 334, to achieve a similar result.

With the arrangement of blocks 332 and 334, it should be understood that the P counter 82 can count inward as far as necessary, limited only by the hardware architecture of the P counter 82, but can only count outward by an amount limited by the upward count number limit. However, in other arrangements, the downward count performed at block 332 can also be limited to be no greater than a downward count number limit. In both of these arrangements, the upward count limit of block 334 is less than the downward count limit of block 332. In the case of either block 332 of 334, the output signal 164 provided by the POSDAC 162 ends up being approximately at the positive peak value of the magnetic field signal 136.

Blocks 318, 330, 332, and 334 will be recognized to be steps that result in bringing the POSDAC 162 toward the positive peak of the magnetic field signal 136, but controlled so as to update downward without limit, or with a relatively large limit (downward excursion limit), in the inward direction, but also controlled to have a limited update (upward excursion limit) in the outward direction. With this arrangement, the POSDAC 162 is less influenced by a signature region in the magnetic field signal 136.

At block 318, if the number of edges provided by the state machine 151 in the output signal 80 of FIG. 3 is not greater than or equal to the first predetermined count value (X) (e.g., two), then the process continues to block 320. At block 320, the switch 158 of FIG. 3 is directed to again provide the signal 56 from the peak counter 54 to the POSDAC 162 and the process continues to block 322.

At block 322, if the number of edges provided by the state machine 151 in the output signal 80 of FIG. 3 is greater than or equal to the first predetermined count value (X) plus the second predetermined count value (Y), the process continues to block 324. Blocks 324 and 326 are described above.

At block 322, if the number of edges provided by the state machine 151 in the output signal 80 is not greater than or equal to the first predetermined count value (X) plus the second predetermined count value (Y), the process proceeds to block 282.

It should be recognized that throughout the process 250, the P counter 82 and the N counter 106 are not used to provide the output signal 80 of FIG. 3. Instead, the P counter 82 and the N counter 106 are stabilized during the process 250 so that they can subsequently be used during the running mode of block 326. When used in the running mode, the P counter 82 and the N counter 106 are used in conjunction with the POSDAC 162 and NDAC 110, respectively, and also with the comparators 94, 116 and threshold logic 98 in order to generate the output signal 80 in a way same as or similar to that described, for example, in one or more of the above-mentioned patents. However, by providing the P counter 82 and the N counter 106 with the above described counter number limits, the accuracy of the output signal 80 when the integrated circuit is in the running mode 82 is less apt to be influenced by a larger than normal cycle of the magnetic field signal 136, as would occur, for example, during a signature region. Therefore, the integrated circuit can achieve greater accuracy in the placement of edges in the output signal 80 in respect to positive and negative peaks of the magnetic field signal.

The above-described improved accuracy tends to be achieved only after the integrated circuit 150 of FIG. 3 has had sufficient time in operation for the P counter 82 and the N counter 106 to reach stable values. Therefore, during the process 250, which occurs during the calibration mode, only the peak counter 54 is used to generate the output signal 80. The peak counter 54 has no count number limits in either direction, and therefore, when connected to the POSDAC 162, the output signal 164 of the POSDAC 162 can rapidly track the magnetic field signal 136 in either direction, including the signature region, and can hold positive and negative peak values of the magnetic field signal, including those larger or smaller peaks that can occur during the signature region.

While the process 250 applies most directly to the integrated circuit 150 of FIG. 3, a similar process can be applied to the integrated circuit 50 of FIG. 2. One of ordinary skill in the art will recognize that various blocks can be deleted from the process 250 in order to make a similar process applicable to the integrated circuit 50 of FIG. 2. For example, block 256 of FIG. 4 as well as blocks 278, 304, 316, 320, and 324 of FIG. 4A can be omitted, since those blocks apply to the switch 158 of FIG. 3, which is not used in FIG. 2. Other blocks that refer to the POSDAC 162 of FIG. 3 would instead refer to the PEAKDAC 58 or the PDAC 86 of FIG. 2, as will be apparent.

Two amplitudes of signature region are shown below in FIGS. 5 and 6, one large in amplitude and one small. It should be appreciated that, in particular, the larger signature region of FIG. 5, if tracked by the tracking signals described below, could cause a proximity detector, for example, the proximity detector of FIG. 2, to generate no output from the peak-to-peak percentage detector portion (i.e., the output signal 100). It should also be appreciated that restricted outward updates of tracking signals described below, can result in the tracking signals being little perturbed by the large signature region, and therefore, in the presence of the large signature region, the proximity detector can operate properly.

Figure 5:
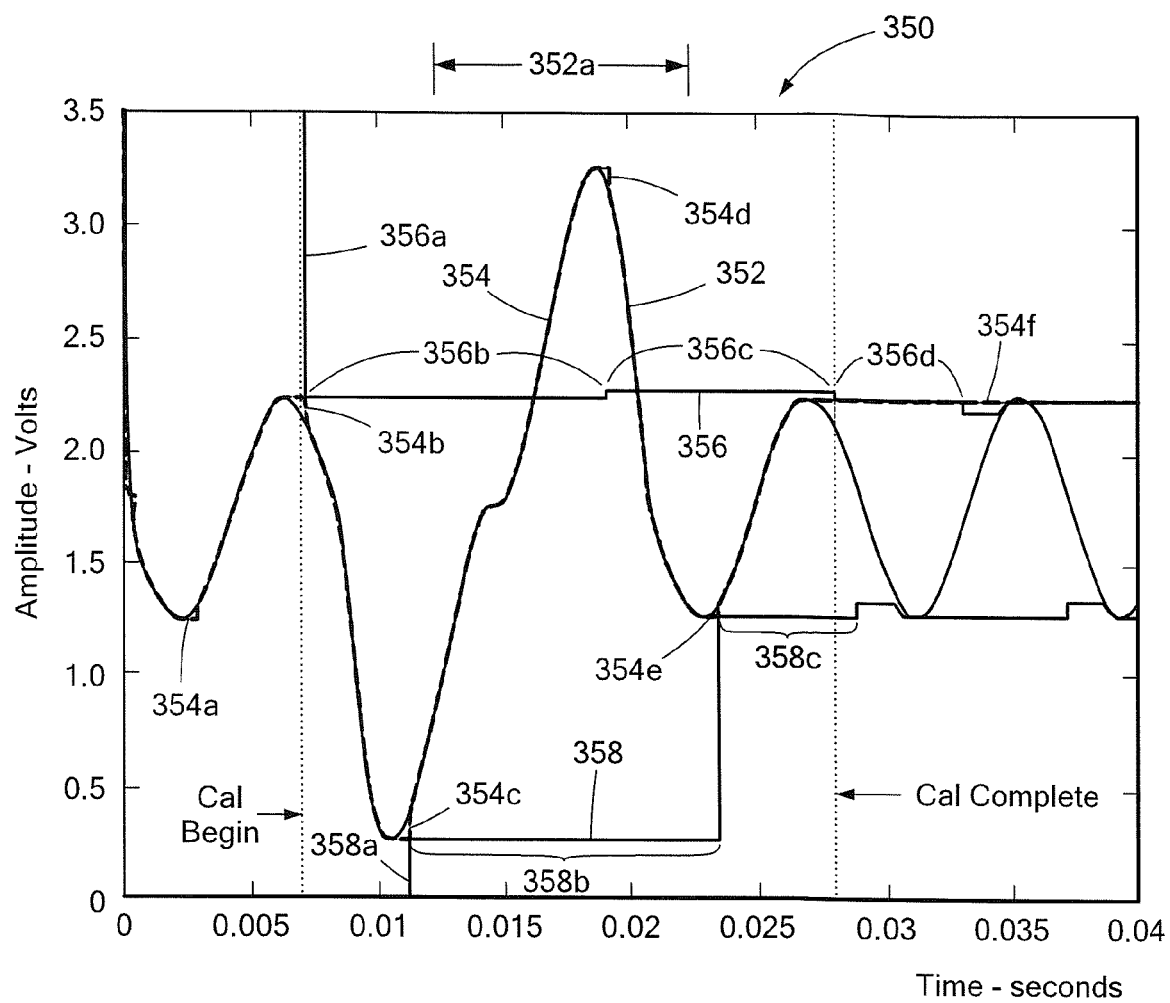
FIG. 5 is a graph showing signals generated by the magnetic field transducer and in conjunction with the two peak detector circuits of FIG. 1 when the integrated circuit calibrates in the presence of a higher amplitude signature region associated with the signature structure of FIG. 1.

Referring now to FIG. 5, a graph 350 includes a horizontal axis in units of time in seconds and a vertical axis in units of amplitude in volts. A signal 352 is representative of a magnetic field signal, for example, the magnetic field signal 136 of FIG. 2. For simplicity, the integrated circuit of FIG. 2, rather than the integrated circuit 150 of FIG. 3, is used below to describe the graph 350. The signal 352 has a signature region during a time region 352a. The signature region includes a cycle of the magnetic field signal 352 that is larger than other cycles. In some applications, the amplitude of the signature region 352a is about twice the amplitude of other portions of the magnetic field signal 352. The calibration of FIGS. 4 and 4A occurs between the vertical lines labeled "cal begins" and "cal complete" and the running mode of FIGS. 4 and 4A begins after the line labeled "cal complete."

A signal 354 is representative of the first tracking signal 60 of FIG. 2. The signal 354 approximately overlays the signal 352, and thus is not readily visible everywhere. However, regions 354a-354e and also a region 354f of the signal 354 (indicated by dashed lines) depart from the magnetic field signal 352. The regions 354f is a portion of the signal 354 when the signal 354 stops tracking the magnetic field signal 352 and is no longer used. The regions 354a, 354c, and 354e correspond to the blocks 282, 284, 286, and 294 of FIG. 4A, wherein the horizontal portions of the regions 354a, 354c, and 354e correspond to held values of negative peaks of the magnetic field signal 352. Similarly, the regions 354b and 354d correspond to the blocks 308, 310, 312, and 328 of FIG. 4A, wherein the horizontal portions of the regions 354b, 354d correspond to held values of positive peaks of the magnetic field signal 352.

A signal 356 is representative of the second tracking signal 88 of FIG. 2. The signal 356 includes a transitioning portion 356a. The signal 356 achieves a first held value during a portion 356b, a second held value during a portion 356c, and a third held value during a portion 356d. The signal 356 corresponds to blocks 318, 330, 332, and 334 of FIG. 4A. As described above, it will be understood that the signal 356 (i.e., the second tracking signal 88 from the PDAC 86 of FIG. 2) can transition inward (downward) by a large amount, for example during the transitioning portion 356a, whereupon it holds a peak value of the magnetic field signal 352. However, the signal 356 is limited in outward (upward) excursions. Thus, the signal 356, in transitioning from the held value during the portion 356b to the held value during the portion 356c, does not go all the way up to the positive peak of the signature region, but is limited by limit count value of block 334 of FIG. 4A.

A signal 358 is representative of the third tracking signal 112 of FIG. 2. The signal 358 includes a transitioning portion 358a. The signal 358 achieves a first held value during a portion 358b and a second held value during a portion 358c. The signal 358 corresponds to blocks 290, 296, 298, and 300 of FIG. 4A. As described above, it will be understood that the signal 358 (i.e., the third tracking signal 112 from the NDAC 110 of FIG. 2) can transition inward (upward) by a large amount, for example during the transitioning portion 358a, whereupon it holds a peak value of the magnetic field signal 352. The signal 358 can again transition by a large amount to achieve the second held value during the portion 358c. However, the signal 358 is limited in outward (downward) excursions.

It should be understood that the second and third tracking signals 356 and 358 hold positive and negative peaks, respectively, of the magnetic field signal 352, but are not very much perturbed by the signature region within the time period 352a. In contrast, the first tracking signal 354 does tend to track much of the magnetic field signal 352, even during the signature region.

The output signal 80 of FIG. 2 is not shown in FIG. 5, but is shown and described in conjunction with FIG. 7 below. Let it suffice here to say that during the calibration mode, the output signal 80 is generated in accordance with the first tracking signal 354. In the running mode, after the time indicated by the vertical line labeled "cal complete," the output signal 80 is generated in accordance with the second and third tracking signals 356, 358.

Figure 6:
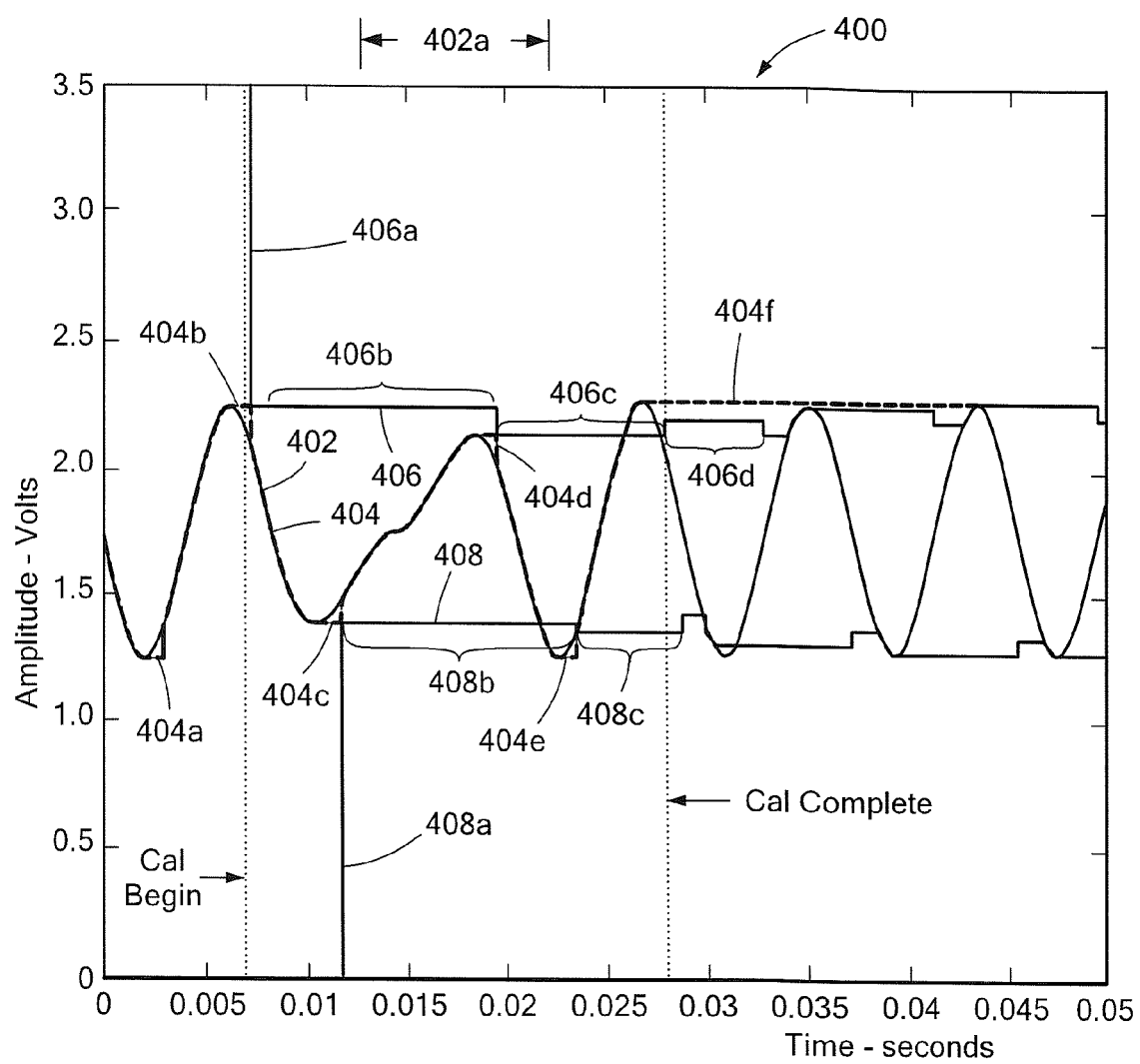
FIG. 6 is a graph showing signals generated by the magnetic field transducer and in conjunction with the two peak detector circuits of FIG. 1 when the integrated circuit calibrates in the presence of a lower amplitude signature region associated with the signature structure of FIG. 1.

Referring now to FIG. 6, a graph 400 includes a horizontal axis in units of time in seconds and a vertical axis in units of amplitude in volts. A signal 402 is representative of a magnetic field signal, for example, the magnetic field signal 136 of FIG. 2. The signal 402 has a signature region during a time region 402a. The signature region includes a cycle of the magnetic field signal 402 that is smaller than other cycles. In some applications, the amplitude of the signature region 402a is about seventy percent of the amplitude of other portions of the magnetic field signal 402. The calibration of FIGS. 4 and 4A occurs between the vertical lines labeled "cal begin" and "cal complete" and the running mode of FIGS. 4 and 4A begins at the line labeled "cal complete."

A signal 404 is representative of the first tracking signal 60 of FIG. 2. The signal 404 approximately overlays the signal 402, and thus is not readily visible everywhere. However, regions 404a-404e and also a region 404f indicated by dashed lines depart from the magnetic field signal 402. The regions 404f is a portion of the signal 404 when the signal 404 stops tracking the magnetic field signal 402 and is no longer used. The regions 404a, 404c, and 404e correspond to the blocks 282, 284, 286, and 294 of FIG. 4A, wherein the horizontal portions of the regions 404a, 404c, and 404e correspond to held values of negative peaks of the magnetic field signal 402. Similarly, the regions 404b and 404d correspond to the blocks 308, 310, 312, and 328 of FIG. 4A, wherein the horizontal portions of the regions 404b, 404d correspond to held values of positive peaks of the magnetic field signal 402.

A signal 406 is representative of the second tracking signal 88 of FIG. 2. The signal 406 includes a transitioning portion 406a. The signal 406 achieves a first held value during a portion 406b, a second held value during a portion 406c, and a third held value during a portion 406d. The signal 406 corresponds to blocks 318, 330, 332, and 334 of FIG. 4A. As described above, it will be understood that the signal 406 (i.e., the second tracking signal 88 from the PDAC 86 of FIG. 2) can transition inward (downward) by a large amount, for example during the transitioning portion 406a, whereupon it holds a peak value of the magnetic field signal 402. However, the signal 406 is limited in outward (upward) excursions. However, not being limited in inward (downward) excursions, the signal 406, in transitioning from the held value during the portion 406b to the held value during the portion 406c, does go all the way down to the positive peak of the signature region.

A signal 408 is representative of the third tracking signal 112 of FIG. 2. The signal 408 includes a transitioning portion 408a. The signal 408 achieves a first held value during a portion 408b and a second held value during a portion 408c. The signal 408 corresponds to blocks 290, 296, 298, and 300 of FIG. 4A. As described above, it will be understood that the signal 408 (i.e., the third tracking signal 112 from the NDAC 110 of FIG. 2) can transition inward (upward) by a large amount, for example during the transitioning portion 408a, whereupon in holds a peak value of the magnetic field signal 402. However, the signal 408 is limited in outward (downward) excursions.

It should be understood that the second and third tracking signals 406 and 408 hold positive and negative peaks, respectively, of the magnetic field signal 402, but are not very much perturbed by the signature region within the time period 402a. The first tracking signal, represented by the signal 404 does tend to track much of the magnetic field signal 402, even during the signature region.

The output signal 80 of FIG. 2 is not shown in FIG. 6, but is shown and described in conjunction with FIG. 7 below. Let it suffice here to say that during the calibration mode, the output signal 80 is generated in accordance with the first tracking signal 404. In the running mode, after the time indicated by the vertical line labeled "cal complete," the output signal 80 is generated in accordance with the second and third tracking signals 406, 408.

Figure 7:
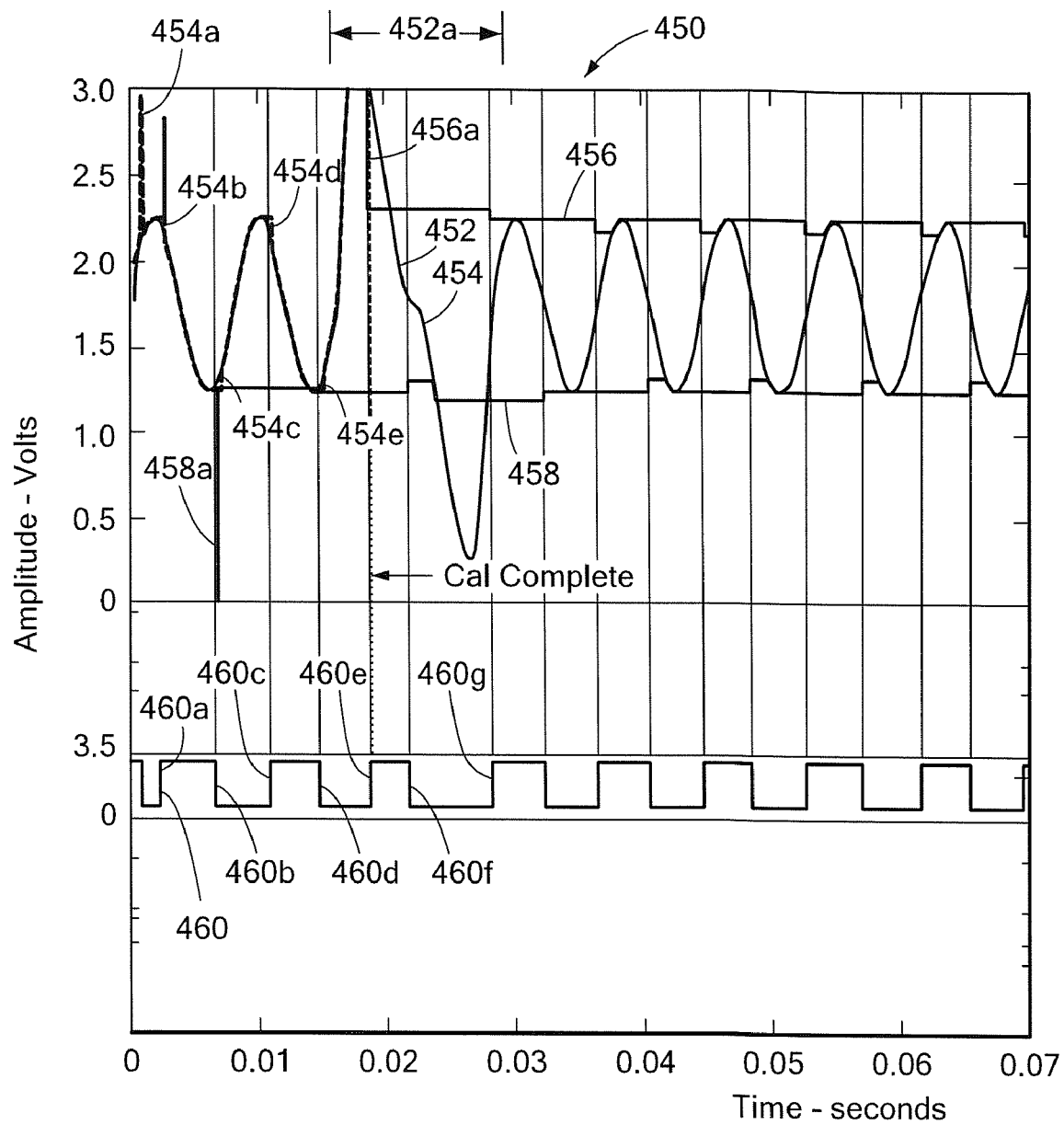
FIG. 7 is a graph showing signals generated by the magnetic field transducer and in conjunction with the two peak detector circuits of FIG. 1 when the integrated circuit starts up with a higher amplitude signature region associated with the signature structure of FIG. 1, and also showing an exemplary output signal generated by the integrated circuit.

Referring now to FIG. 7, a graph 450 includes a horizontal axis in units of time in seconds and a vertical axis in units of amplitude in volts. A signal 452 is representative of a magnetic field signal, for example, the magnetic field signal 136 of FIG. 2. The signal 452 has a signature region during a time region 452a. The signature region includes a cycle of the magnetic field signal 452 that is larger than other cycles.

A signal 454 is representative of the first tracking signal 60 of FIG. 2. The signal 454 approximately overlays the signal 452, and thus is not readily visible everywhere. However, regions 454a-454d indicated by dashed lines depart from the magnetic field signal 452.

A signal 456 is representative of the second tracking signal 88 of FIG. 2. The signal 456 includes a transitioning portion 456a. The signal 456 achieves various held values after the transitioning portion 456a.

A signal 458 is representative of the third tracking signal 112 of FIG. 2. The signal 458 includes a transitioning portion 458a. The signal 458 achieves various held values after the transitioning portion 458a.

It should be understood that the second and third tracking signals represented by the signals 456 and 458 hold positive and negative peaks, respectively, of the magnetic field signal 452, but are not very much perturbed by the signature region within the time period 452a. The first tracking signal, represented by the signal 454 does tend to track much of the magnetic field signal 452, even during the signature region, and hold values of the magnetic field signal at the regions 454b-454e.

The output signal 80 of FIG. 2 during the calibration mode is represented by a signal 460 having edges 460a-460f and further edges, which are not labeled. Edges 460a-460d of output signal 460 are generated at the times of the vertical portions of the regions 454b-454c of the first tracking signal 454, i.e., at times when the first tracking signal 454 differs from the magnetic field signal 452 by at least a hysteresis value. In the running mode, after the time indicated by the vertical line labeled "cal complete," edges 460f, 460g and other edges of the output signal 460 are generated in accordance with the second and third tracking signals 456, 458.

Figure 8:
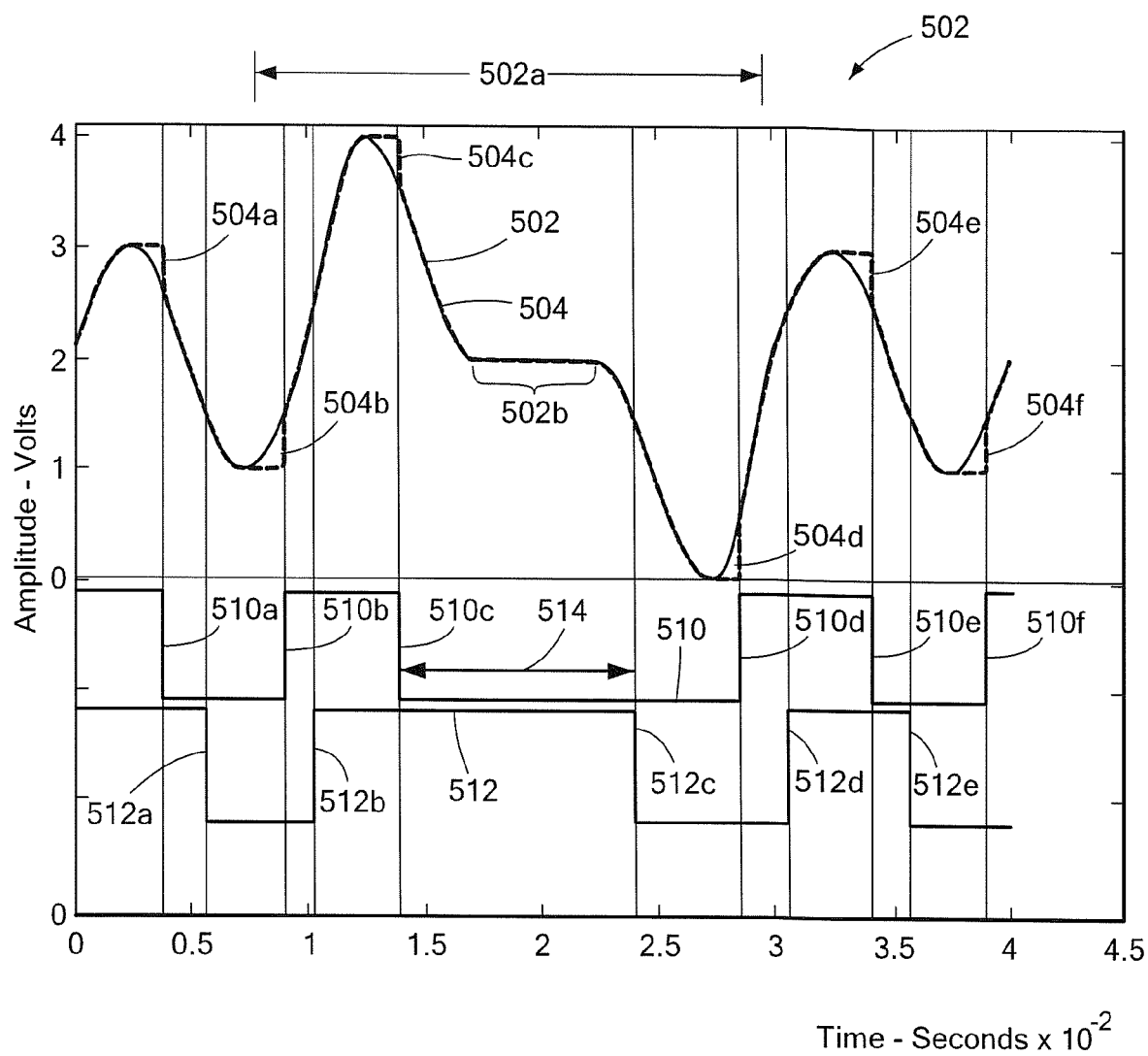
FIG. 8 is a graph showing signals generated in conjunction with the magnetic field transducer and by the two peak detector circuits of FIG. 1 when operating with one output phase during a calibration period.

Referring now to FIG. 8, a graph 500 includes a horizontal axis in units of time in seconds and a vertical axis in units of amplitude in volts. A signal 502 is representative of a magnetic field signal, for example, the magnetic field signal 136 of FIG. 2. The signal 502 has a signature region during a time region 502a and also a flat region 502b. The signature region includes a cycle of the magnetic field signal 502 that is larger than other cycles. It should be recognized that in some arrangements, the flat region 502b has a slope other than zero, or is not a straight line.

A signal 504 is representative of the first tracking signal 60 of FIG. 2. The signal 504 approximately overlays the signal 502, and thus is not readily visible everywhere. However, regions 504a-504f indicated by dashed lines depart from the magnetic field signal 502. The signal 504 and regions 504a-504f represent the first tracking signal generated by the PEAKDAC 58 of FIG. 2.

A signal 510 is indicative of the output signal 80 of FIG. 2, in particular, the output signal 80 during the above described calibration mode during which the output signal 80 is generated in accordance with the first tracking signal 504. Edges 510a-510f of output signal 510 are generated at the times of the vertical portions of the regions 504a-504f, respectively, of the first tracking signal 504, i.e., at times when the first tracking signal 504 differs from the magnetic field signal 502 by at least a hysteresis value.

A signal 512 is representative of the output signal 80 of FIG. 2 when in the running mode. Edges 512a-512e of the output signal 512 are generated in accordance with the second and third tracking signals 88, 112, of FIG. 2.

A phase error 514 is indicative of a time shift of a falling edge when transitioning between the calibration mode represented by the signal 510 and the running mode represented by the signal 512. It is desirable that the phase error be as small as possible. It will be understood that the phase error 514 is made worse by the presence of the flat region 502b in the magnetic field signal 502.

Figure 9:
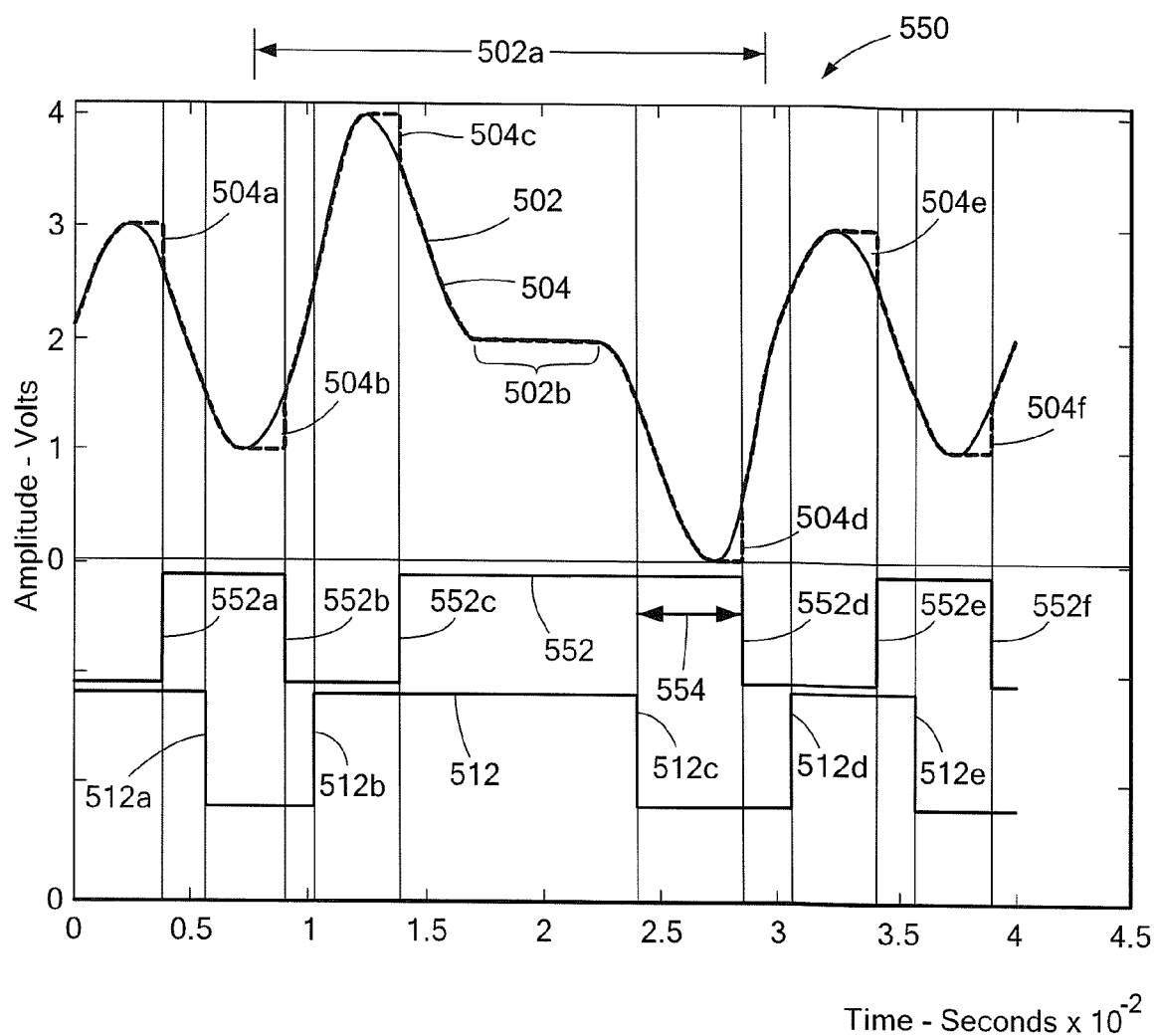
FIG. 9 is a graph showing signals generated by the magnetic field transducer and in conjunction with the two peak detector circuits of FIG. 1 when operating with another output phase during the calibration period.

Referring now to FIG. 9, a graph 550, in which like elements of FIG. 8 are shown having like reference designations, includes a horizontal axis in units of time in seconds and a vertical axis in units of amplitude in volts. The graph 500 includes the above-described signals 502, 504, and 512.

A signal 552 is indicative of the output signal 80 of FIG. 2, in particular, the output signal 80 during the above described calibration mode during which the output signal 80 is generated in accordance with the first tracking signal 504. Edges 552a-552f of output signal 552 are generated at the times of the vertical portions of the regions 504a-504f, respectively, of the first tracking signal 504, i.e., at times when the first tracking signal 504 departs from the magnetic field signal 502 by at least a hysteresis value. The edges 552a-552f of the output signal 552 are in the opposite direction (i.e., one hundred eighty degrees) from the edges 510a-510f of the output signal 510 of FIG. 8.

A phase error 554 is indicative of a time shift of a falling edge when transitioning between the calibration mode represented by the signal 554 and the running mode represented by the signal 512. The phase error 554 is smaller than the phase error 514 of FIG. 8, and thus, the edge accuracy is improved. Therefore, providing the output signal 552 during the calibration mode rather than the signal 510 of FIG. 8, results in a better edge accuracy.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A proximity detector, comprising:
a magnetic field transducer for providing a magnetic field signal indicative of a changing magnetic field;
a first peak detector circuit responsive, during a determined time period, to the magnetic field signal, for providing a first tracking signal, which, at a first time, holds a first value corresponding to a positive peak of the magnetic field signal, and which holds, at a second different time, a second value corresponding to a negative peak of the magnetic field signal;
a second peak detector circuit responsive, during the determined time period and also after the determined time period, to the magnetic field signal, for providing a second tracking signal, which holds a third value corresponding to a positive peak of the magnetic field signal, and for providing a third tracking signal, which holds a fourth value corresponding to a negative peak of the magnetic field signal, wherein the second tracking signal has an upward excursion limit and a downward excursion limit, wherein the upward excursion limit of the second tracking signal is smaller than the downward excursion limit of the second tracking signal, and wherein the third tracking signal has an upward excursion limit and a downward excursion limit, wherein the upward excursion limit of the third tracking signal is larger than the downward excursion limit of the third tracking signal; and
an output control circuit coupled to the first and second peak detector circuits and coupled to receive the magnetic field signal, wherein the output control circuit is configured to provide an output signal, which, during the determined time period, changes state in response to the first peak detector circuit, and which, after the determined time period, changes state in response to the second peak detector circuit.

2. The proximity detector of claim 1, wherein the output control circuit is configured to provide the output signal, which, during the determined time period, changes state when the magnetic field signal varies from the first tracking signal by a predetermined amount, and which, after the determined time period, changes state when the magnetic field signal varies from the second tracking signal by a first predetermined percentage of a difference between the second and third tracking signals, and which, also after the determined time period, changes state again when the magnetic field signal varies from the third tracking signal by a second predetermined percentage of the difference between the second and third tracking signals.

3. The proximity detector of claim 2, wherein the first and second predetermined percentages are the same.

4. The proximity detector of claim 1, wherein the determined time period begins when the second tracking signal and the third tracking signal differ by a predetermined amount.

5. The proximity detector of claim 4, wherein the determined time period ends when the output signal has changed state a predetermined number of times.

6. The proximity detector of claim 1, wherein the determined time period ends when the output signal has changed state a predetermined number of times.

7. The proximity detector of claim 1, wherein the first peak detector circuit comprises:
a first counter configured to count in a first direction during rising portions of the magnetic field signal and configured to count in a second different direction during falling portions of the magnetic field signal; and
a first digital-to-analog converter having an input coupled to the first counter and having an output coupled to the output control circuit.

8. The proximity detector of claim 7, wherein the second peak detector circuit comprises:
a second counter configured to count up and down so that the second tracking signal reaches the third value, wherein the second counter has an upward count number limit associated with the upward excursion limit of the second tracking signal and a downward count number limit associated with the downward excursion limit of the second tracking signal, wherein the upward count number limit of the second counter is smaller than the downward count number limit of the second counter;
a third counter configured to count up and down so that the third tracking signal reaches the fourth value, wherein the third counter has an upward count number limit associated with the upward excursion limit of the third tracking signal and a downward count number limit associated with the downward excursion limit of the third tracking signal, wherein the upward count number limit of the third counter is larger than the downward count number limit of the third counter;
wherein the input of the first digital-to-analog converter is further coupled to the second counter; and
a second digital-to-analog converter having an input coupled to the third counter and having an output coupled to the output control circuit.

9. The proximity detector of claim 7, wherein the second peak detector circuit comprises:
a second counter configured to count up and down so that the second tracking signal reaches the third value, wherein the second counter has an upward count number limit associated with the upward excursion limit of the second tracking signal and a downward count number limit associated with the downward excursion limit of the second tracking signal, wherein the upward count number limit of the second counter is smaller than the downward count number limit of the second counter;
a third counter configured to count up and down so that the third tracking signal reaches the fourth value, wherein the third counter has an upward count number limit associated with the upward excursion limit of the third tracking signal and a downward count number limit associated with the downward excursion limit of the third tracking signal, wherein the upward count number limit of the third counter is larger than the downward count number limit of the third counter;
a second digital-to-analog converter having an input coupled to the second counter and having an output coupled to the output control circuit; and
a third digital-to-analog converter having an input coupled to the third counter and having an output coupled to the output control circuit.

10. The proximity detector of claim 1, wherein, during the determined time period, the output signal changes to a lower state when a negative peak of the magnetic field signal varies from the first tracking signal by the first a predetermined amount, and wherein, also during the determined time period, the output signal changes state again to a higher state when a positive peak of the magnetic field signal varies from the first tracking signal by the first predetermined amount.

11. A method of detecting a ferromagnetic article, comprising:
generating a magnetic field signal indicative of changing magnetic field;
generating, with a first peak detector circuit, during a determined time period, a first tracking signal, which holds, at a first time, a first value corresponding to a positive peak of the magnetic field signal, and which holds, at a second different time, a second value corresponding to a negative peak of the magnetic field signal;
generating, with a second peak detector circuit, during the determined time period and also after the determined time period, a second tracking signal, which holds a third value corresponding to a positive peak of the magnetic field signal, wherein the second tracking signal has an upward excursion limit and a downward excursion limit, wherein the upward excursion limit of the second tracking signal is smaller than the downward excursion limit of the second tracking signal;
generating, with the second peak detector circuit, during the determined time period and also after the determined time period, a third tracking signal, which holds a fourth value corresponding to a negative peak of the magnetic field signal, wherein the third tracking signal has an upward excursion limit and a downward excursion limit, wherein the upward excursion limit of the third tracking signal is larger than the downward excursion limit of the third tracking signal; and
generating an output signal, which, during the determined time period, changes state in response to the first peak detector circuit, and which, after the determined time period, changes state in response to the second peak detector circuit.

12. The method of claim 11, wherein the output signal, during the determined time period, changes state when the magnetic field signal varies from the first tracking signal by a predetermined amount, and, after the determined time period, changes state when the magnetic field signal varies from the second tracking signal by a first predetermined percentage of a difference between the second and third tracking signals, and, also after the determined time period, changes state again when the magnetic field signal varies from the third tracking signal by a second predetermined percentage of the difference between the second and third tracking signals.

13. The method of claim 12, wherein the first and second predetermined percentages are the same.

14. The method of claim 11, wherein the determined time period begins when the second tracking signal and the third tracking signal differ by a predetermined amount.

15. The method of claim 14, wherein the determined time period ends when the output signal has changed state a predetermined number of times.

16. The method of claim 11, wherein the determined time period ends when the output signal has changed state a predetermined number of times.

17. The method of claim 11, wherein the generating, during the determined time period, the first tracking signal comprises:
   counting with a first counter configured to count in a first direction during rising portions of the magnetic field signal and configured to count in a second different direction during falling portions of the magnetic field signal to provide a first counter signal;
   converting the first counter signal with a first digital-to-analog converter to provide the output signal during the determined time period.

18. The method of claim 17, wherein the generating, during the determined time period and also after the determined time period, the second tracking signal comprises:
   counting with a second counter configured to count up and down so that the second tracking signal reaches the third value, wherein the second counter has an upward count number limit associated with the upward excursion limit of the second tracking signal and a downward count number limit associated with the downward excursion limit of the second tracking signal, wherein the upward count number limit of the second counter is smaller than the downward count number limit of the second counter; and wherein the generating, during the determined time period and also after the determined time period, the third tracking signal comprises:
   counting with a third counter configured to count up and down so that the third tracking signal reaches the fourth value, wherein the third counter has an upward count number limit associated with the upward excursion limit of the third tracking signal and a downward count number limit associated with the downward excursion limit of the third tracking signal, wherein the upward count number limit of the third counter is larger than the downward count number limit of the third counter; and wherein the generating the output signal comprises:
   converting the second counter signal with the first digital-to-analog converter to provide a second converted signal;
   converting the third counter signal with a second digital-to-analog converter to provide a third converted signal; and
   combining the second converted signal and the third converted signal to provide the output signal after the determined time period.

19. The method of claim 17, wherein the generating, during the determined time period and also after the determined time period, the second tracking signal comprises:
   counting with a second counter configured to count up and down so that the second tracking signal reaches the third value, wherein the second counter has an upward count number limit associated with the upward excursion limit of the second tracking signal and a downward count number limit associated with the downward excursion limit of the second tracking signal, wherein the upward count number limit of the second counter is smaller than the downward count number limit of the second counter; and wherein the generating, during the determined time period and also after the determined time period, the third tracking signal comprises:
   counting with a third counter configured to count up and down so that the third tracking signal reaches the fourth value, wherein the third counter has an upward count number limit associated with the upward excursion limit of the third tracking signal and a downward count number limit associated with the downward excursion limit of the third tracking signal, wherein the upward count number limit of the third counter is larger than the downward count number limit of the third counter; and wherein the generating the output signal comprises:
   converting the second counter signal with a second digital-to-analog converter to provide a second converted signal;
   converting the third counter signal with a third digital-to-analog converter to provide a third converted signal; and
   combining the second converted signal and the third converted signal to provide the output signal after the determined time period.

20. The method of claim 11, wherein, during the determined time period, the output signal changes to a lower state when the negative peak of the magnetic field signal varies from the first tracking signal by a predetermined amount, and wherein, also during the determined time period, the output signal changes state again to a second different state when the positive peak of the magnetic field signal varies from the first tracking signal by the predetermined amount.

* * * * *

UNITED STATES PATENT AND TRADEMARK OFFICE
CERTIFICATE OF CORRECTION

PATENT NO. : 7,982,454 B2
APPLICATION NO. : 11/768370
DATED : July 19, 2011
INVENTOR(S) : Devon Fernandez et al.

It is certified that error appears in the above-identified patent and that said Letters Patent is hereby corrected as shown below:

Column 3, line 26 delete "changing magnetic" and replace with --a changing magnetic--.

Column 5, line 66 delete "to the hold" and replace with --to hold the--.

Column 6, line 14 delete "away the" and replace with --away from the--.

Column 6, lines 59-60 delete "that, that" and replace with --that,--.

Column 8, line 3, please insert a missing paragraph as amended in the Replacement Amendment in Response to Notice of Non-Compliant Amendment
-- It will generally be understood from discussion below that, that, if the ring magnet 48 is already rotating, the determined time period generally begins shortly after a power-up time of the integrated circuit 10. Alternatively, if the ring magnet 48 is not already rotating when the integrated circuit 10 powers up, the determined time period begins shortly after the ring magnet 48 begins to rotate.--.

Column 9, line 60 delete "result" and replace with --results--.

Column 10, line 54 delete "rest reset" and replace with --reset--.

Column 11, line 27 delete "racking" and replace with --tracking--.

Column 12, line 10 delete "signal" and replace with --signals--.

Column 15, line 26 delete "12" and replace with --112--.

Column 15, line 60 delete "signal" and replace with --signal 136--.

Column 18, line 48 delete "p" and replace with --P--.

Signed and Sealed this
Tenth Day of July, 2012

David J. Kappos
*Director of the United States Patent and Trademark Office*

CERTIFICATE OF CORRECTION (continued)
U.S. Pat. No. 7,982,454 B2

Column 20, line 12 delete "signal" and replace with --signal 136--.

Column 20, line 53 delete "begins"" and replace with --begin"--.

Column 21, line 13 delete "in" and replace with --it--.

Column 21, line 67 delete "regions" and replace with --region--.

Column 22, line 38 delete "in" and replace with --it--.

Column 26, line 22 delete "by the first a" and replace with --by a first--.